US012802628B2

(12) United States Patent
Kim et al.

(10) Patent No.: US 12,802,628 B2
(45) Date of Patent: Nov. 17, 2026

(54) ELECTRONIC DEVICE AND DRIVING METHOD THEREOF

(71) Applicant: Samsung Display Co., Ltd., Yongin-si (KR)

(72) Inventors: Jihye Kim, Yongin-si (KR); Sangan Kwon, Yongin-si (KR); Changnoh Yoon, Yongin-si (KR); Namjeong Kim, Yongin-si (KR); Jiyoun Kim, Yongin-si (KR); Haneul Kim, Yongin-si (KR); Hongsoo Kim, Yongin-si (KR); Sukhun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/257,826

(22) Filed: Jul. 2, 2025

(65) Prior Publication Data

US 2026/0120624 A1 Apr. 30, 2026

(30) Foreign Application Priority Data

Oct. 30, 2024 (KR) ........................ 10-2024-0150568

(51) Int. Cl.
*G09G 3/32* (2016.01)
*G09G 3/00* (2006.01)

(52) U.S. Cl.
CPC ............... *G09G 3/32* (2013.01); *G09G 3/035* (2020.08); *G09G 2300/0819* (2013.01); *G09G 2300/0852* (2013.01); *G09G 2300/0861* (2013.01); *G09G 2310/04* (2013.01); *G09G 2310/08* (2013.01);

(Continued)

(58) Field of Classification Search
CPC ... G09G 2320/0686; G09G 2340/0435; G09G 2330/021; G09G 2300/0842
See application file for complete search history.

(56) References Cited

U.S. PATENT DOCUMENTS

| | | | |
|---|---|---|---|
| 9,633,608 | B2 | 4/2017 | Shin |
| 11,798,463 | B2 | 10/2023 | Kim et al. |
| 11,862,073 | B2 | 1/2024 | Yoon et al. |

(Continued)

FOREIGN PATENT DOCUMENTS

| | | | |
|---|---|---|---|
| CN | 116229859 | A | 6/2023 |
| KR | 10-2237438 | B1 | 4/2021 |

(Continued)

*Primary Examiner* — Van N Chow
(74) *Attorney, Agent, or Firm* — Sughrue Mion, PLLC

(57) ABSTRACT

An electronic device includes a display panel including a pixel; a driving controller configured to receive an input image signal and a control signal, and configured to output a voltage control signal; and a voltage generator configured to generate a bias voltage based on the voltage control signal. The driving controller, in a multi-frequency mode, controls to drive a first display area of the display panel at a first frequency, and a second display area of the display panel at a second frequency different from the first frequency. The driving controller, in the multi-frequency mode, outputs the voltage control signal such that the bias voltage has a first bias voltage level based on the first display area being driven, and the bias voltage has a second voltage level different from the first bias voltage level based on the second display area being driven.

20 Claims, 21 Drawing Sheets

(52) U.S. Cl.
CPC ............... *G09G 2320/0233* (2013.01); *G09G 2320/0613* (2013.01); *G09G 2330/021* (2013.01)

(56) References Cited

U.S. PATENT DOCUMENTS

| | | | | |
|---|---|---|---|---|
| 11,862,096 | B2 | 1/2024 | Kim et al. | |
| 2022/0084472 | A1* | 3/2022 | Kim | G09G 3/3291 |
| 2023/0026979 | A1* | 1/2023 | Kwon | G09G 3/3208 |
| 2023/0104904 | A1* | 4/2023 | Kim | G09G 3/3233<br>345/204 |
| 2023/0245619 | A1* | 8/2023 | Yoon | G09G 3/3233<br>345/691 |
| 2023/0260449 | A1* | 8/2023 | Yoon | G09G 3/32<br>345/55 |
| 2024/0249661 | A1* | 7/2024 | Jin | G09G 3/32 |
| 2024/0371312 | A1 | 11/2024 | Kim et al. | |

FOREIGN PATENT DOCUMENTS

| | | | |
|---|---|---|---|
| KR | 10-2023-0049176 | A | 4/2023 |
| KR | 10-2023-0084400 | A | 6/2023 |
| KR | 10-2023-0116984 | A | 8/2023 |
| KR | 10-2024-0161855 | A | 11/2024 |

* cited by examiner

ELECTRONIC DEVICE AND DRIVING METHOD THEREOF

CROSS-REFERENCE TO RELATED APPLICATION

This application is based on and claims priority under 35 U.S.C. § 119 to Korean Patent Application No. 10-2024-0150568, filed on Oct. 30, 2024, in the Korean Intellectual Property Office, the disclosure of which is herein incorporated by reference in its entirety.

BACKGROUND

One or more example embodiments of the present disclosure described herein relate to an electronic device and a method of driving the electronic device.

Electronic devices such as smartphones, digital cameras, laptop computers, navigation devices, monitors, and smart televisions may display images.

An electronic device includes a plurality of pixels for displaying an image and a driver circuit for controlling the plurality of pixels. Each of the plurality of pixels may include a light emitting element and a pixel circuit for controlling the light emitting element. The pixel circuit may include a plurality of transistors organically connected to one another.

As electronic devices have diversified fields of use, a plurality of different images may be displayed on a single electronic device.

SUMMARY

One or more example embodiments of the present disclosure provide an electronic device capable of reducing power consumption and preventing display quality deterioration, and a driving method thereof.

According to an aspect of an example embodiment, an electronic device includes: a display panel including a pixel; a driving controller configured to receive an input image signal and a control signal, and configured to output a voltage control signal; and a voltage generator configured to generate a bias voltage based on the voltage control signal, wherein the pixel includes: a first transistor including a first electrode, a second electrode, and a gate electrode; and a second transistor including a first electrode connected to the first electrode of the first transistor, a second electrode connected to a bias voltage line receiving the bias voltage, and a gate electrode, wherein the driving controller is configured to, in a multi-frequency mode, control to drive a first display area of the display panel at a first frequency, and to drive a second display area of the display panel at a second frequency different from the first frequency, and wherein the driving controller is configured to, in the multi-frequency mode, output the voltage control signal such that the bias voltage has a first bias voltage level based on the first display area being driven, and the bias voltage has a second voltage level different from the first bias voltage level based on the second display area being driven.

According to an aspect of an example embodiment, a method for driving an electronic device is provided, the electronic device including a display panel, which includes a pixel, the pixel including a first transistor, and a second transistor connected between a first electrode of the first transistor and a bias voltage line receiving a bias voltage. The method includes: identifying a first frequency of a first display area of the display panel, a second frequency of a second display area, and a start location of the second display area in a multi-frequency mode; determining whether an operating mode is a boundary area compensation mode; and controlling a voltage level of the bias voltage based on determining that the operating mode is the boundary area compensation mode, wherein the controlling the voltage level of the bias voltage includes: controlling the bias voltage to have a first bias voltage level based on the first display area being driven in the multi-frequency mode; and controlling the bias voltage to have a second voltage level different from the first bias voltage level based on a boundary area, which is adjacent to the first display area, within the second display area being driven.

According to an aspect of an example embodiment, an electronic device includes: a display panel including pixels; and a driving controller configured to control the display panel, wherein the driving controller is configured to drive a first display area at a first frequency and a second display area of the display panel at a second frequency, wherein the driving controller is configured to output a voltage control signal such that a bias voltage input to a pixel corresponding to the first display area has a first bias voltage level and a bias voltage input to a pixel corresponding to the second display area has a second bias voltage level different from the first bias voltage level based on the second display area being driven, and wherein the driving controller is configured to output the voltage control signal such that the first bias voltage level and the second bias voltage level has a difference therebetween based on a difference between the first frequency and the second frequency.

BRIEF DESCRIPTION OF FIGURES

The above and other objects and features of the present disclosure will become apparent by describing in detail example embodiments thereof with reference to the accompanying drawings.

DETAILED DESCRIPTION

Figure 1:
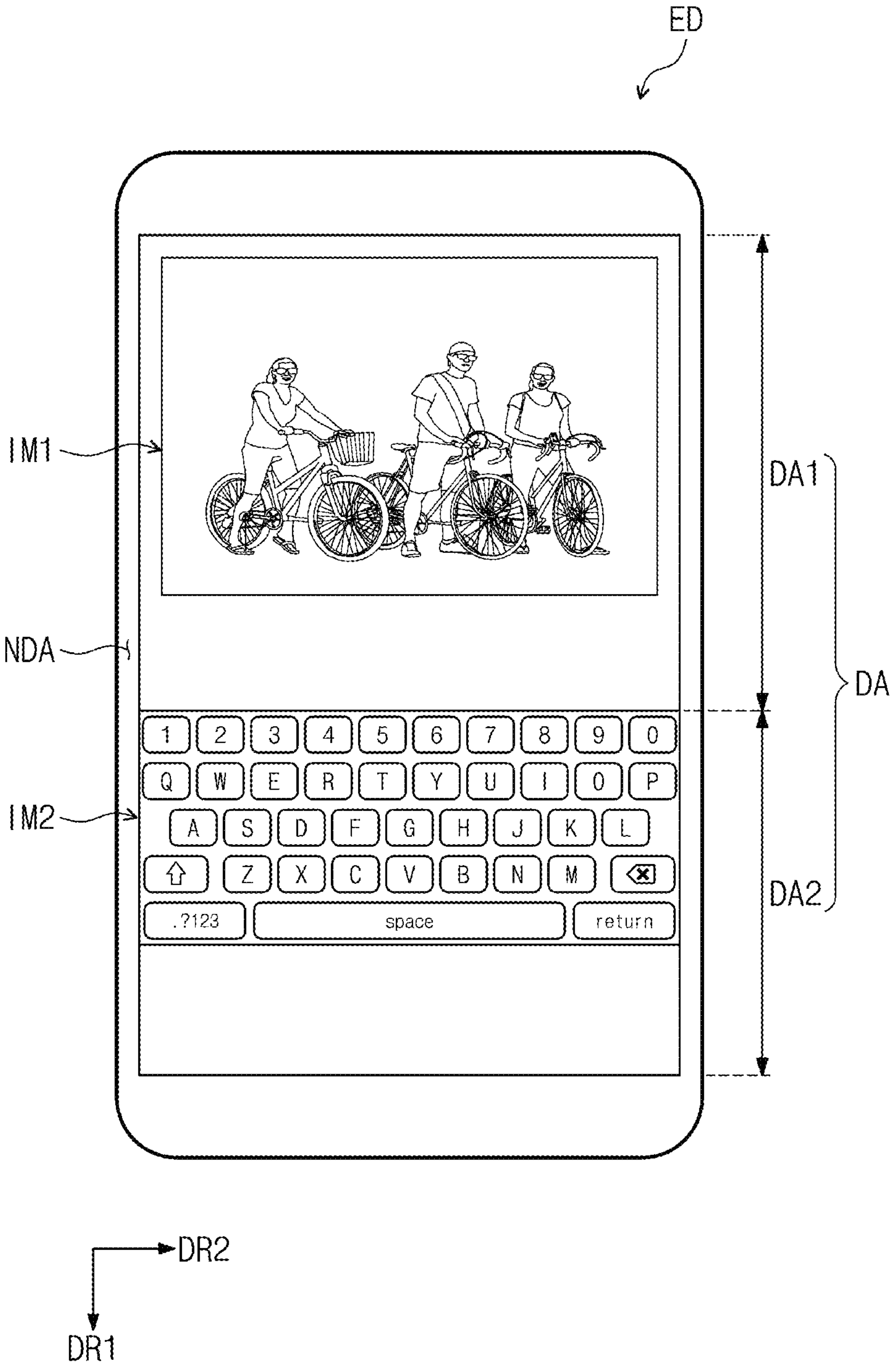
FIG. 1 is a plan view of an electronic device, according to one or more embodiments of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components may be exaggerated for effectiveness of description of technical contents. The term "and/or" may include one or more combinations of the associated listed items as well as each individual item of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, and/or a combination thereof, not precluding the presence or additional possibility of one or more other features, numbers, steps, operations, elements, or components and/or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, example embodiments of the present disclosure will be described with reference to accompanying drawings.

FIG. 1 is a plan view of an electronic device, according to an embodiment of the present disclosure.

Referring to FIG. 1, a portable terminal (e.g., display device) is illustrated as an example of an electronic device ED according to one or more embodiments of the present disclosure. The portable terminal may include, for example but not limited to, a tablet PC, a smartphone, a personal digital assistant (PDA), a portable multimedia player (PMP), a game console, a wristwatch-type electronic device, and the like. However, the present disclosure is not limited thereto. The present disclosure may be used for a small electronic device and/or a medium electronic device such as, for example but not limited to, a personal computer, a notebook computer, a kiosk, a car navigation unit, and a camera, and/or a large-sized electronic equipment such, for example but not limited to, as a television or an outdoor billboard. The above examples are provided only as an embodiment, and it is to be understood that the present disclosure may be applied to any other electronic device(s) without departing from the concept of the present disclosure.

As shown in FIG. 1, the electronic device ED may include a display device, and a display surface, on which a first image IM1 and a second image IM2 are displayed, may be parallel to a plane defined by a first direction DR1 and a second direction DR2. The electronic device ED may include a plurality of areas on the display surface. The display surface may include a display area DA, in which the first image IM1 and the second image IM2 are displayed, and a non-display area NDA adjacent to the display area DA. The non-display area NDA may be referred to as a bezel area. For example, the display area DA may have a rectangular shape. The non-display area NDA may surround the display area DA. Also, although not illustrated, for example, the electronic device ED may include a shape that is partially curved. As a result, one area of the display area DA may have a curved shape.

The display area DA of the electronic device ED may include a first display area DA1 and a second display area DA2. In a specific application program, the first image IM1 may be displayed on the first display area DA1, and the second image IM2 may be displayed on the second display area DA2. For example, the first image IM1 may be a video, and the second image IM2 may be a still image or an image having a low change frequency (e.g., a keypad for game control, text information, or the like) (that is, not changing often).

The electronic device ED according to an embodiment may drive the first display area DA1, on which a video is displayed, at a first frequency higher than or equal to a reference frequency (or a normal frequency), and may drive the second display area DA2, on which a still image or an image having a low change frequency is displayed, at a second frequency lower than the reference frequency. The electronic device ED may reduce power consumption by lowering the frequency of the second display area DA2.

A size of each of the first display area DA1 and the second display area DA2 may be a predetermined size, and may be changed by an application program. In an embodiment, when the still image is displayed in the first display area DA1 and the video is displayed in the second display area DA2, the first display area DA1 may be driven at a second frequency lower than the reference frequency, and the second display area DA2 may be driven at a first frequency higher than or equal to the reference frequency. In an embodiment, the display area DA may be divided into three or more display areas. A frequency of each of the display areas may be determined depending on a type (e.g., a still image or a video) of an image displayed in each of the display areas.

Figure 2A:
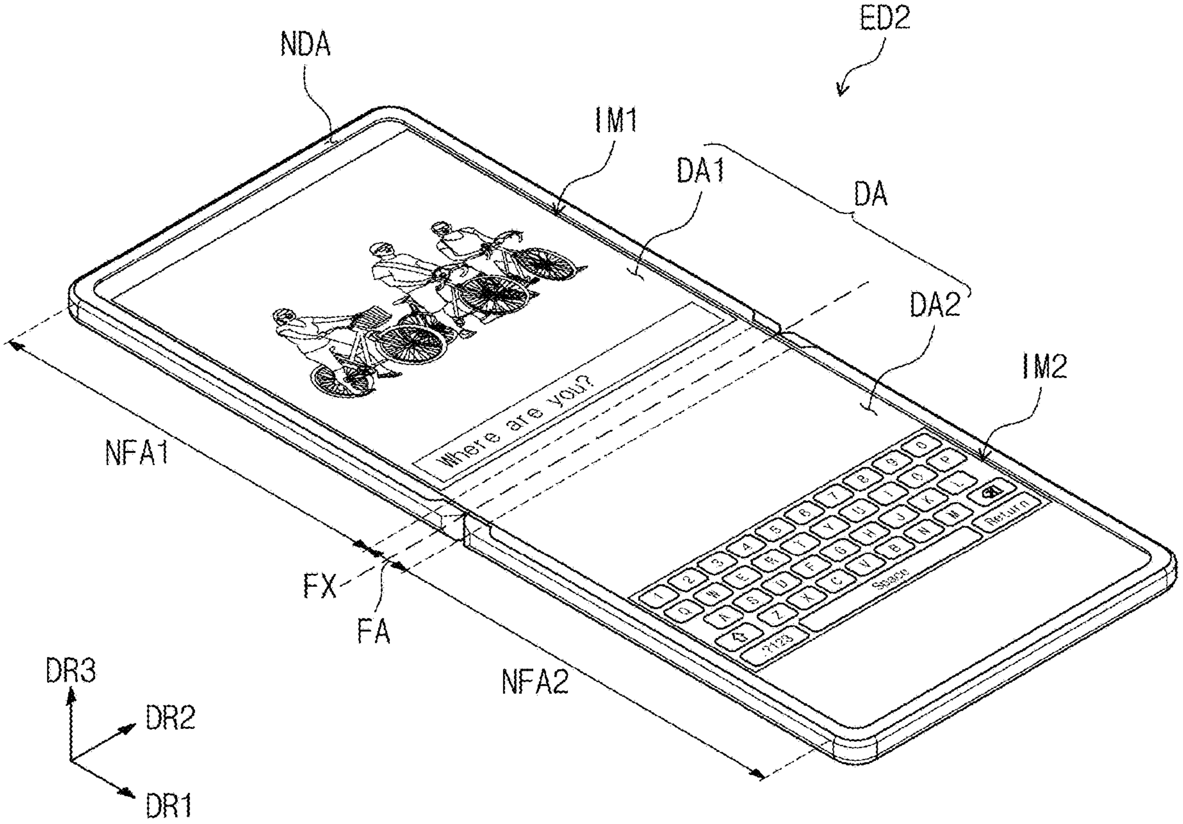
FIGS. 2A and 2B are perspective views of an electronic device, according to one or more embodiments of the present disclosure.
Figure 2B:
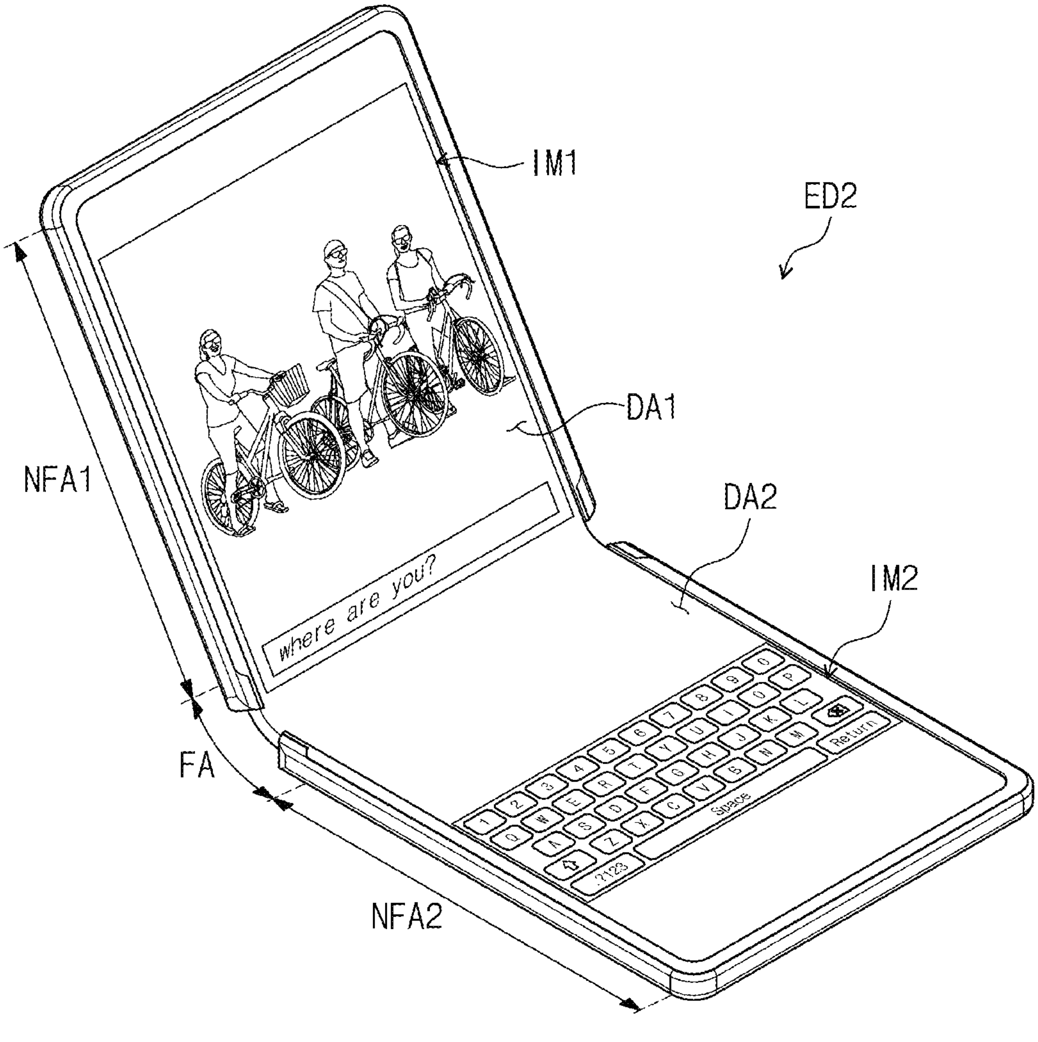

FIGS. 2A and 2B are perspective views of an electronic device ED2, according to one or more embodiments of the present disclosure. FIG. 2A illustrates that the electronic device ED2 is in an unfolded state. FIG. 2B illustrates that the electronic device ED2 is in a folded state.

As shown in FIGS. 2A and 2B, the electronic device ED2 may include the display area DA and the non-display area NDA. The electronic device ED2 may display an image on the display area DA. The display area DA may include a plane defined by the first direction DR1 and the second direction DR2, in a state where the electronic device ED2 is unfolded. A thickness direction of the electronic device ED2 may be parallel to a third direction DR3 intersecting the first direction DR1 and the second direction DR2. Accordingly, a front surface (or an upper surface) and a back surface (or a lower surface) of one or more components included in the electronic device ED2 may be defined based on the third direction DR3. For example, the display area DA may have a rectangular shape. The non-display area NDA may surround the display area DA. However, the present disclosure is not limited thereto.

The display area DA may include a first non-folding area NFA1, a folding area FA, and a second non-folding area NFA2. The folding area FA may be between the first non-folding area NFA1 and the second non-folding area NFA2. The folding area FA may be bent about a folding axis FX extending in the second direction DR2. The folding area FA may be bent inwardly or outwardly based on the folding axis FX.

When the electronic device ED2 is folded (e.g., folded inwardly), the first non-folding area NFA1 and the second non-folding area NFA2 may face each other along the third direction DR3. Accordingly, while being fully folded, the display area DA may not be exposed to an outside of the electronic device ED2, which may be referred to as "in-folding" (or "in-folding state" or "in-folding operation". However, embodiments are not limited thereto and an operation and a configuration of the electronic device ED2 is not limited thereto.

In an embodiment of the present disclosure, when the electronic device ED2 is folded (e.g., folded outwardly), the first non-folding area NFA1 and the second non-folding area NFA2 may be opposite to each other and face a direction away from each other. Accordingly, while being folded (partially or fully), the first non-folding area NFA1 (or the second non-folding area NF2 or the display area DA) may be exposed to the outside, which may be referred to as "out-folding" (or "out-folding state" or "out-folding operation").

The electronic device ED2 may be configured to perform only one operation of an in-folding operation or an out-folding operation. Alternatively, the electronic device ED2 may be configured to perform both the in-folding operation and the out-folding operation. In this case, the same area of the electronic device ED2, for example, the folding area FA may be foldable inwardly and outwardly. Alternatively, at least one area of the electronic device ED2 may be foldable inwardly, and another at least one area may be foldable outwardly.

One folding area and two non-folding areas are illustrated in FIGS. 2A and 2B, but a number of folding areas and a number of non-folding areas are not limited thereto. For example, the electronic device ED2 may include a plurality of non-folding areas, of which the number is greater than two, and a plurality of folding areas, each of which is interposed between non-folding areas adjacent to one another.

FIGS. 2A and 2B illustrate that the folding axis FX is parallel to a minor axis of the electronic device ED2. However, the present disclosure is not limited thereto. For example, the folding axis FX may extend in a direction parallel to a major axis of the electronic device ED2, for example, the first direction DR1.

FIGS. 2A and 2B illustrate that the first non-folding area NFA1, the folding area FA, and the second non-folding area NFA2 may be sequentially arranged in the first direction DR1. However, the present disclosure is not limited thereto. For example, the first non-folding area NFA1, the folding area FA, and the second non-folding area NFA2 may be sequentially arranged in the second direction DR2.

The plurality of display areas DA1 and DA2 may be defined in the display area DA of the electronic device ED2. FIG. 2A illustrates the two display areas DA1 and DA2 as an example. However, a number of display areas DA1 and DA2 is not limited thereto.

The plurality of display areas DA1 and DA2 may include the first display area DA1 and the second display area DA2. For example, the first display area DA1 may be an area where the first image IM1 is displayed, and the second display area DA2 may be an area in which the second image IM2 is displayed. However, the present disclosure is not limited thereto. For example, the first image IM1 may be a video, and the second image IM2 may be a still image or an image (e.g., text information or the like) having a low change frequency.

The electronic device ED2 according to an embodiment may operate differently depending on an operating mode. The operating mode may include a single frequency mode and a multi-frequency mode. The electronic device ED2 may drive both the first display area DA1 and the second display area DA2 at a reference frequency in the single frequency mode. In an embodiment, in the multi-frequency mode, the electronic device ED2 may drive the first display area DA1, where the first image IM1 is displayed, at a first frequency, and may drive the second display area DA2, where the second image IM2 is displayed, at a second frequency lower than the first frequency. In an embodiment, the first frequency may be equal to or higher than the reference frequency.

The size of each of the first display area DA1 and the second display area DA2 may be a predetermined size, and may be changed by an application program. In an embodiment, the first display area DA1 may correspond to the first non-folding area NFA1, and the second display area DA2 may correspond to the second non-folding area NFA2. In an embodiment, a first portion of the folding area FA may correspond to the first display area DA1, and a second portion of the folding area FA may correspond to the second display area DA2.

In an embodiment, the entire folding area FA may correspond to only one of the first display area DA1 and the second display area DA2.

In an embodiment, the first display area DA1 may correspond to a first portion of the first non-folding area NFA1, and the second display area DA2 may correspond to a second portion of the first non-folding area NFA1, the folding area FA, and the second non-folding area NFA2. That is, the size of the second display area DA2 may be greater than the size of the first display area DA1.

In an embodiment, the first display area DA1 may correspond to the first non-folding area NFA1, the folding area FA, and a first portion of the second non-folding area NFA2, and the second display area DA2 may be a second portion of the second non-folding area NFA2. That is, the size of the first display area DA1 may be greater than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrate that the electronic device ED2 has one folding area, as an example of a display device. However, the present disclosure is not limited thereto. For example, the present disclosure may also be applied to a display device having two or more folding areas, a rollable display device, or a slideable display device.

Hereinafter, the electronic device ED shown in FIG. 1 will be described as an example. However, the electronic device ED shown in FIG. 1 may be applied to the electronic device ED2 shown in FIGS. 2A and 2B.

Figure 3A:
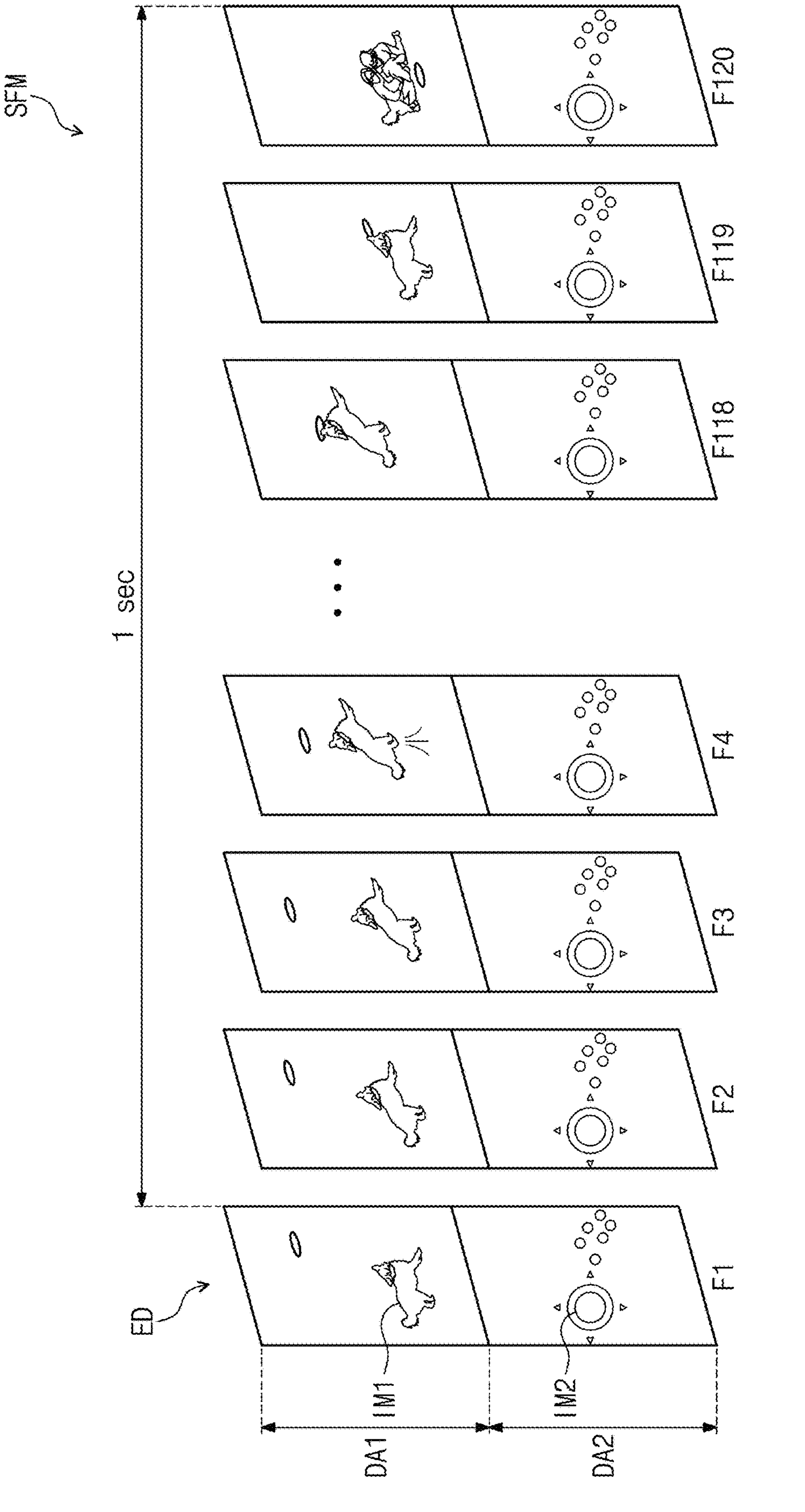
FIG. 3A is a diagram for describing an operation of an electronic device in a single frequency mode, according to one or more embodiments of the present disclosure.
Figure 3B:
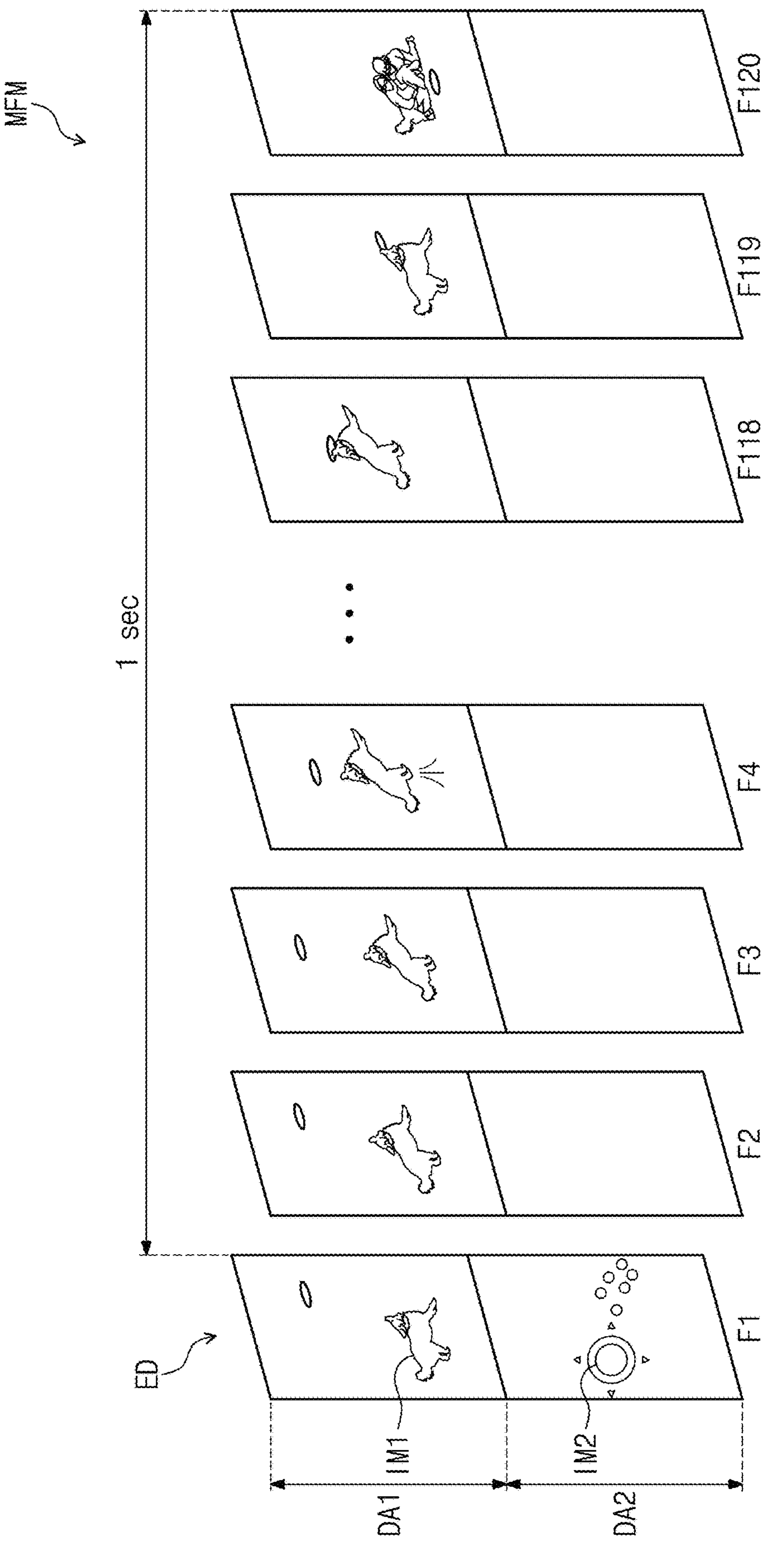
FIG. 3B is a diagram for describing an operation of an electronic device in a multi-frequency mode, according to one or more embodiments of the present disclosure.

FIG. 3A is a diagram for describing an operation of an electronic device in a single frequency mode SFM, according to one or more embodiments of the present disclosure. FIG. 3B is a diagram for describing an operation of an electronic device in a multi-frequency mode MFM, according to one or more embodiments of the present disclosure.

Referring to FIG. 3A, the first image IM1 displayed in the first display area DA1 may be a video. The second image IM2 displayed in the second display area DA2 may be a still image or an image (e.g., a keypad for manipulating a game) having a low change frequency. The first image IM1 displayed in the first display area DA1 and the second image IM2 displayed in the second display area DA2 that are shown in FIG. 1 are merely examples, and various kinds of images may be displayed on the electronic device ED.

In the single frequency mode SFM, each of the first display area DA1 and the second display area DA2 of the electronic device ED may be operated at a first frequency. For example, the first frequency may be 120 Hz. When the first frequency is 120 Hz, images from first to 120th frames F1 to F120 of the first image IM1 and the second image IM2 may be displayed for 1 second in the first display area DA1 and the second display area DA2.

Referring to FIG. 3B, in the multi-frequency mode MFM, the electronic device ED may set a frequency of the first display area DA1, in which the first image IM1 (e.g., a video) is displayed, as the first frequency, and may set a frequency of the second display area DA2, in which the second image IM2 (e.g., a still image) is displayed, as a second frequency lower than the first frequency. For example, the first frequency may be 120 Hz, and the second frequency may be 1 Hz. The first frequency and the second frequency may be variously changed. For example, when the reference frequency is 120 Hz, the first frequency may be 120 Hz the same as the reference frequency, or, as an example, 144 Hz that is higher than the reference frequency. The second frequency may be, as an example, one of 60 Hz, 30 Hz, 15 Hz, 10 Hz, or 1 Hz, which is lower than the reference frequency.

In the multi-frequency mode MFM, when the first frequency is 120 Hz and the second frequency is 1 Hz, the first image IM1 may be displayed in each of the first to 120th frames F1 to F120 in the first display area DA1 of the electronic device ED for 1 second. The second image IM2 may be displayed in the second display area DA2 only for the first frame F1 during a period of 1 second, and an image may not be displayed for frames F2 to F120 during the period of 1 second. In an embodiment, in the second display area DA2, the same image as the first frame F1 may be repeatedly displayed in replacement for each of the second to 120th frames F2 to F120.

Figure 4:
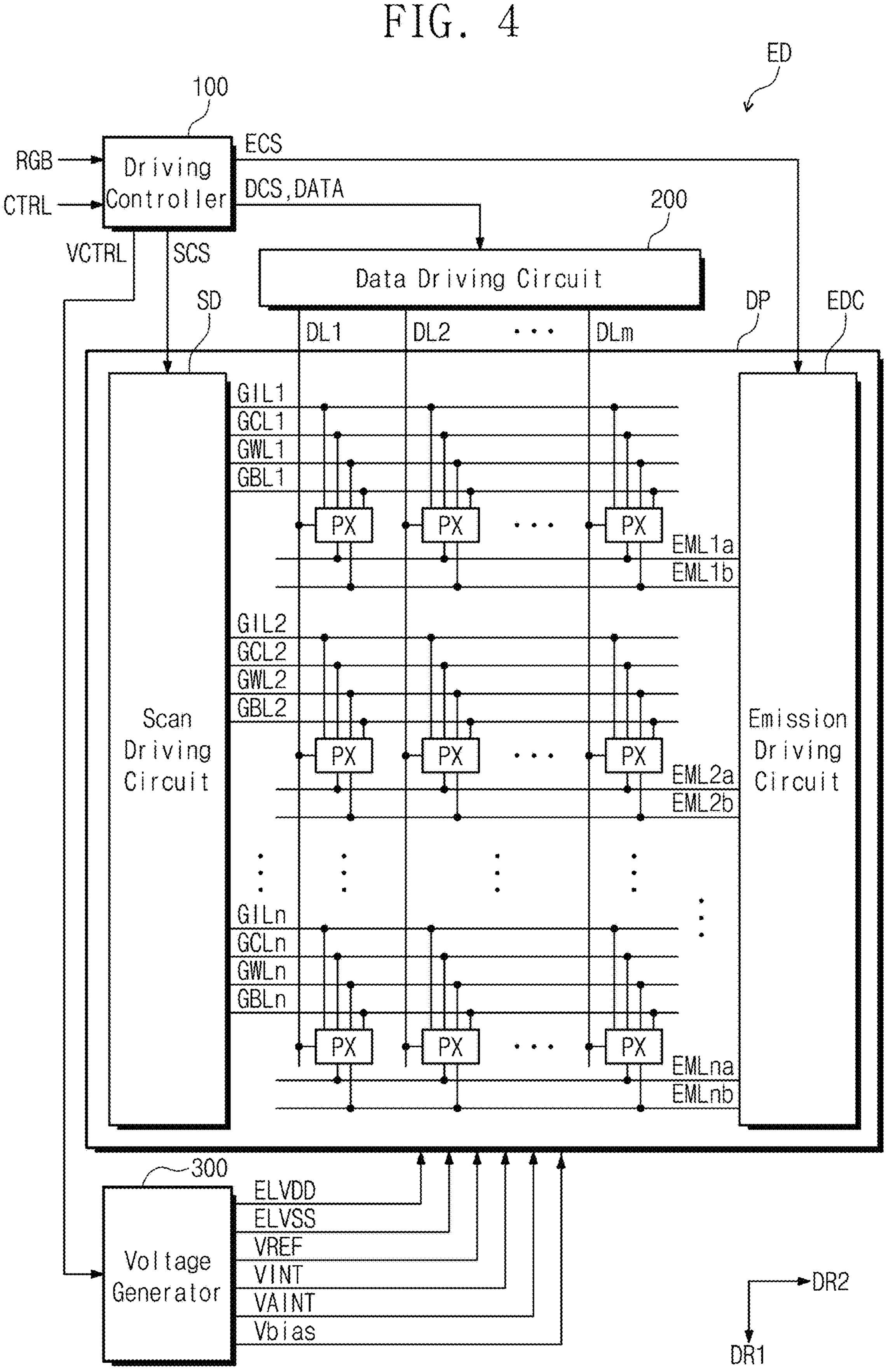
FIG. 4 is a block diagram of an electronic device, according to one or more embodiments of the present disclosure.

FIG. 4 is a block diagram of an electronic device, according to one or more embodiments of the present disclosure.

Referring to FIG. 4, the electronic device ED may include a display panel DP, a driving controller 100, a data driving circuit 200, and a voltage generator 300.

The driving controller 100 may receive an image signal RGB and a control signal CTRL. The driving controller 100 may generate an image data signal DATA by converting a data format of the image signal RGB to be suitable for an interface specification of the data driving circuit 200. The driving controller 100 may output a scan control signal SCS, a data control signal DCS, and an emission driving control signal ECS. In an embodiment, the driving controller 100 may output a voltage control signal VCTRL depending on an operating mode.

The data driving circuit 200 may receive the data control signal DCS and the image data signal DATA from the driving controller 100. The data driving circuit 200 may convert the image data signal DATA into data signals and then output the data signals to a plurality of data lines DL1 to DLm to be described later. The data signals may refer to analog voltages corresponding to a grayscale level of the image data signal DATA. The plurality of data lines DL1 to DLm may extend from the data driving circuit 200 in the first direction DR1 and may be arranged spaced apart from each other in the second direction DR2.

The voltage generator 300 may generate voltages used to operate the display panel DP. In an embodiment, the voltage generator 300 may generate a first driving voltage ELVDD, a second driving voltage ELVSS, a reference voltage VREF, a first initialization voltage VINT, a second initialization voltage VAINT, and a bias voltage Vbias. In an embodiment, the voltage generator 300 may determine a voltage level of the bias voltage Vbias in response to the voltage control signal VCTRL. In an embodiment, the voltage generator 300 may determine a voltage level of the second initialization voltage VAINT in response to the voltage control signal VCTRL.

The display panel DP may include scan lines GIL1 to GILn, GCL1 to GCLn, GWL1 to GWLn, and GBL1 to GBLn, emission control lines EML1*a* to EMLna and EML1*b* to EMLnb, the data lines DL1 to DLm, and pixels PX. The display panel DP may further include a scan driving circuit SD and an emission driving circuit EDC. In an embodiment, the scan driving circuit SD may be arranged on a first side of the display panel DP. The scan lines GIL1 to GILn, GCL1 to GCLn, GWL1 to GWLn, and GBL1 to GBLn may extend from the scan driving circuit SD in the second direction DR2.

The emission driving circuit EDC may be arranged on a second side of the display panel DP. The emission control lines EML1*a* to EMLna and EML1*b* to EMLnb extend from the emission driving circuit EDC in an opposite direction of the second direction DR2.

The scan lines GIL1 to GILn, GCL1 to GCLn, GWL1 to GWLn, and GBL1 to GBLn and the emission control lines EML1*a* to EMLna and EML1*b* to EMLnb may be arranged spaced apart from each other in the first direction DR1.

In the example shown in FIG. 4, the scan driving circuit SD and the emission driving circuit EDC may be arranged to face each other with the pixels PX interposed therebetween, but the present disclosure is not limited thereto. For example, the scan driving circuit SD and the emission driving circuit EDC may be positioned adjacent to each other on one of the first side and the second side of the display panel DP. In an embodiment, the scan driving circuit SD and the emission driving circuit EDC may be implemented with one circuit.

The plurality of pixels PX may be electrically connected to the scan lines GIL1 to GILn, GCL1 to GCLn, GWL1 to GWLn, and GBL1 to GBLn, the emission control lines EML1*a* to EMLna and EML1*b* to EMLnb, and the data lines DL1 to DLm. Each of the plurality of pixels PX may be electrically connected to four scan lines and two emission control lines. For example, as shown in FIG. 4, a first row of pixels may be connected to the scan lines GIL1, GCL1, GWL1, and GBL1 and the emission control lines EML1*a* and EML1*b*. Also, a second row of pixels may be connected to the scan lines GIL2, GIL2, GWL2, and GBL2 and the emission control lines EML2*a* and EML2*b*. An n-th row of pixels may be connected to the scan lines GILn, GCLn, GWL2*n*, and GBLn and the emission lines EMLna and EMLnb.

Each of the plurality of pixels PX may include a light emitting diode LD (refer to FIG. 5) and a pixel circuit PXC (refer to FIG. 5) for controlling light emission of the light emitting diode LD. The pixel circuit PXC may include one or more transistors and one or more capacitors. The scan driving circuit SD and the emission driving circuit EDC may include transistors formed through the same process as transistors of the pixel circuit PXC.

Each of the plurality of pixels PX may receive the first driving voltage ELVDD, the second driving voltage ELVSS, the reference voltage VREF, the first initialization voltage VINT, the second initialization voltage VAINT, and the bias voltage Vbias from the voltage generator 300.

The scan driving circuit SD may receive the scan control signal SCS from the driving controller 100. The scan driving circuit SD may output scan signals to the scan lines GIL1 to GILn, GCL1 to GCLn, GWL1 to GWLn, and GBL1 to GBLn in response to the scan control signal SCS.

The emission driving circuit EDC may output emission control signals to the emission control lines EML1*a* to EMLna and EML1*b* to EMLnb in response to the emission driving control signal ECS received from the driving controller 100.

The driving controller 100 according to an embodiment of the present disclosure may determine an operating mode of the electronic device ED and may control the data driving circuit 200, the scan driving circuit SD, and the emission driving circuit EDC depending on the determined operating mode. In an embodiment, the operating mode may include a single frequency mode and a multi-frequency mode.

Figure 5:
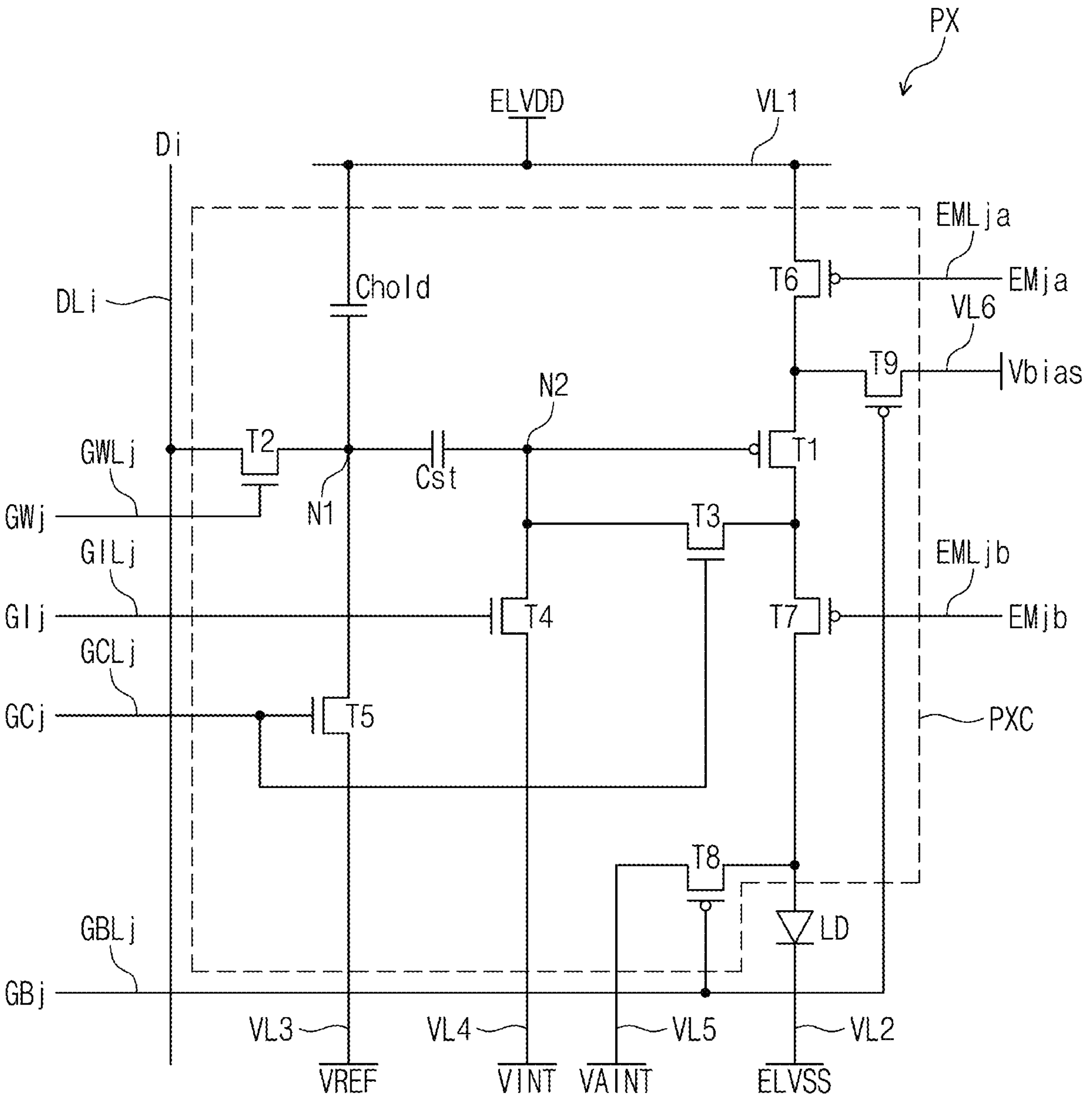
FIG. 5 is a circuit diagram of a pixel, according to one or more embodiments of the present disclosure.

FIG. 5 is a circuit diagram of a pixel PX, according to one or more embodiments of the present disclosure.

FIG. 5 illustrates an equivalent circuit diagram of a pixel PX connected to the i-th data line DLi among the data lines DL1 to DLm, j-th scan lines GILj, GCLj, GWLj, and GBLj among the scan lines GIL1 to GILn, GCL1 to GCLn, GWL1 to GWLn, and GBL1 to GBLn, and j-th emission control lines EMLja and EMLjb among the emission control lines ML1*a* to EMLna and EML1*b* to EMLnb, which are illustrated in FIG. 4.

Each of the plurality of pixels PX shown in FIG. 4 may have the same circuit configuration as the equivalent circuit diagram of the pixel PX shown in FIG. 5.

Referring to FIG. 5, the pixel PX included in the electronic device ED (refer to FIG. 4) according to an embodiment may include the pixel circuit PXC and at least one light emitting diode LD. In an embodiment, one pixel PX may include one light emitting diode LD.

The pixel circuit PXC may include first to ninth transistors T1, T2, T3, T4, T5, T6, T7, T8, and T9 and capacitors Chold and Cst. In an embodiment, each of the first and sixth to ninth transistors T1 and T6 to T9 may be a P-type transistor having a low-temperature polycrystalline silicon (LTPS) semiconductor layer, and each of the second to fifth transistors T2 to T5 may be an N-type transistor having an oxide semiconductor as a semiconductor layer, but the present disclosure is not limited thereto. In an embodiment, all of the first to ninth transistors T1 to T9 may be P-type or N-type transistors. In an embodiment, at least one of the first to ninth transistors T1 to T9 may be a P-type transistor and the remaining transistors may be N-type transistors.

Moreover, a circuit configuration of the pixel PX according to an embodiment of the present disclosure is not limited to an embodiment in FIG. 5. The pixel PX illustrated in FIG. 5 is only an example, and the circuit configuration of the pixel PX may be modified and implemented.

The scan lines GILj, GCLj, GWLj, and GBLj may deliver scan signals GIj, GCj, GWj, and GBj, respectively. The emission control lines EMLja and EMLjb may deliver emission control signals EMja and EMjb, respectively. The data line DLi may deliver a data signal Di. The data signal Di may have a voltage level corresponding to the image signal RGB input to the electronic device ED (refer to FIG. 4). First to sixth voltage lines VL1 to VL6 may deliver the first driving voltage ELVDD, the second driving voltage ELVSS, the reference voltage VREF, the first initialization voltage VINT, the second initialization voltage VAINT, and the bias voltage Vbias to the pixel PX, respectively.

The capacitor Chold may be connected between the first voltage line VL1 and a first node N1. The capacitor Cst may be connected between the first node N1 and a second node N2.

The first transistor T1 may include a first electrode electrically connected to the first voltage line VL1 via the sixth transistor T6, a second electrode electrically connected to an anode of the light emitting diode LD via the seventh transistor T7, and a gate electrode connected to the second node N2.

The second transistor T2 may include a first electrode connected to the data line DLi, a second electrode connected to the first node N1, and a gate electrode connected to the scan line GWLj. The second transistor T2 may deliver the data signal Di, which is received through the data line DLi, to the first node N1 in response to the scan signal GWj received through the scan line GWLj.

The third transistor T3 may include a first electrode connected to the second electrode of the first transistor T1, a second electrode connected to the second node N2, and a gate electrode connected to the scan line GCLj. The third transistor T3 may electrically connect the gate electrode of the first transistor T1 and the second electrode of the first transistor T1 in response to the scan signal GCj received through the scan line GCLj.

The fourth transistor T4 may include a first electrode connected to the second node N2, a second electrode connected to the fourth voltage line VL4 (or a first initialization voltage line), and a gate electrode connected to the scan line GILj. The fourth transistor T4 may deliver the first initialization voltage VINT, which is received through the fourth voltage line VL4, to the second node N2 in response to the scan signal GIj received through the scan line GILj.

The fifth transistor T5 may include a first electrode connected to the first node N1, a second electrode connected to the third voltage line VL3 (or a reference voltage line), and a gate electrode connected to the scan line GCLj. The fifth transistor T5 may be turned on in response to the scan signal GCj received through the scan line GCLj to deliver the reference voltage VREF to the first node N1.

The sixth transistor T6 may include a first electrode connected to the first voltage line VL1, a second electrode connected to the first electrode of the first transistor T1, and a gate electrode connected to the emission control line EMLja. The sixth transistor T6 may be turned on in response to the emission control signal EMja received through the emission control line EMLja to electrically connect the first voltage line VL1 to the first electrode of the first transistor T1.

The seventh transistor T7 may include a first electrode connected to the second electrode of the first transistor T1, a second electrode connected to the anode of the light emitting diode LD, and a gate electrode connected to the emission control line EMLjb. The seventh transistor T7 may be turned on in response to the emission control signal EMjb received through the emission control line EMLjb to electrically connect the second electrode of the first transistor T1 to the light emitting diode LD.

The eighth transistor T8 may include a first electrode connected to the anode of the light emitting diode LD, a second electrode connected to the fifth voltage line VL5 (or a second initialization voltage line), and a gate electrode connected to the scan line GBLj. The eighth transistor T8 may be turned on in response to the scan signal GBj received through the scan line GBLj to bypass a current of the anode of the light emitting diode LD to the fifth voltage line VL5. Alternatively, the eighth transistor T8 may be turned on in response to the scan signal GBj received through the scan line GBLj to initialize the anode of the light emitting diode LD to the second initialization voltage VAINT.

The ninth transistor T9 (or a bias transistor) may include a first electrode connected to the first electrode of the first transistor T1, a second electrode connected to the sixth voltage line VL6 (or a bias voltage line), and a gate electrode connected to the scan line GBLj. The ninth transistor T9 may be turned on in response to the scan signal GBj received through the scan line GBLj to electrically connect the sixth voltage line VL6 to the first electrode of the first transistor T1.

The light emitting diode LD may include the anode connected to the second electrode of the seventh transistor T7 and a cathode connected to a second voltage line VL2.

Figure 6:
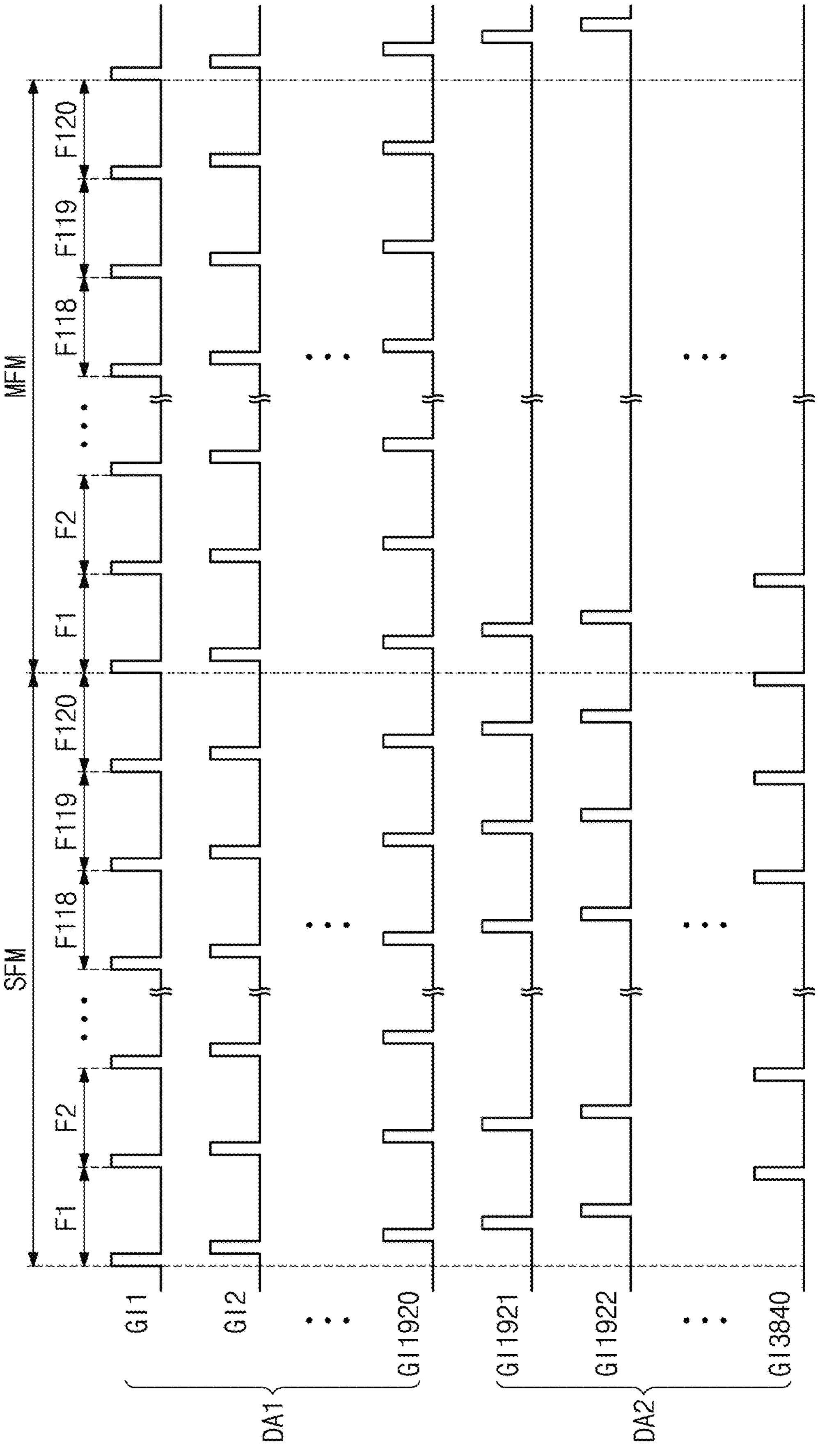
FIG. 6 shows an example of scan signals in a single frequency mode and a multi-frequency mode, according to one or more embodiments of the present disclosure.

FIG. 6 shows an example of scan signals GI1 to GI3840 in the single frequency mode SFM and the multi-frequency mode MFM, according to one or more embodiments of the present disclosure.

FIG. 6 illustrates 3840 scan signals GI1 to GI3840, but the present disclosure is not limited thereto. A number of scan signals GI1 to GI3840 may vary depending on a size and a resolution of the display panel DP.

Referring to FIGS. 5 and 6, in the single frequency mode SFM, a frequency of the scan signals GI1 to GI3840 may be 120 Hz. In the single frequency mode SFM, the scan signals GI1 to GI3840 may be activated to high levels in each of the first to 120th frames F1 to F120.

In an embodiment, in the multi-frequency mode MFM, among the scan signals GI1 to GI3840, the scan signals GI1 to GI1920 may correspond to the first display area DA1 of the electronic device ED illustrated in FIG. 1, and the scan signals GI1921 to GI3840 may correspond to the second display area DA2 of the electronic device ED illustrated in FIG. 1.

In the multi-frequency mode MFM, the scan signals GI1 to GI1920 may be activated to high levels in each of the first to 120th frames F1 to F120, and the scan signals GI1921 to GI3840 may be activated to high levels only in the first frame F1. That is, in the multi-frequency mode MFM, a frequency of the scan signals GI1 to GI1920 corresponding to the first display area DA1, where the first image IM1 (e.g., a video) is displayed, may be 120 Hz, and a frequency of the scan signals GI1921 to GI3840 corresponding to the second display area DA2, where the second image IM2 (e.g., a still image) is displayed, may be 1 Hz.

The scan signals GC1 to GCn and GW1 to GWn illustrated in FIG. 4 may have waveforms similar to waveforms of the scan signals GI1 to GI3840 illustrated in FIG. 6. That is, in the single frequency mode SFM, the frequency of each of the scan signals GC1 to GCn and GW1 to GWn may be a first frequency. In the multi-frequency mode MFM, the frequency of the scan signals corresponding to the first display area DA1 among the scan signals GC1 to GCn and GW1 to GWn may be the first frequency, and the frequency of the scan signals corresponding to the second display area DA2 may be a second frequency lower than the first frequency.

Figure 7:
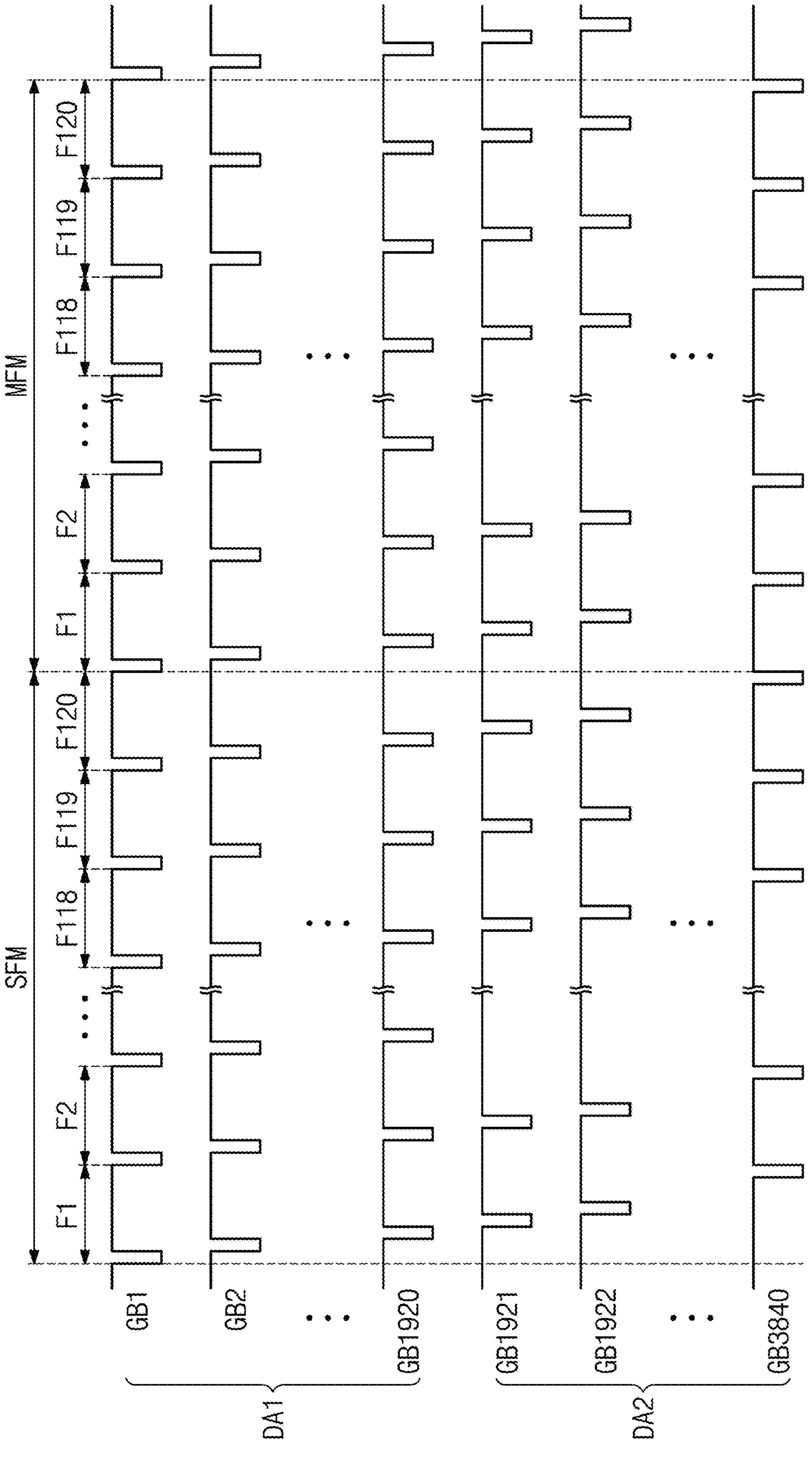
FIG. 7 shows an example of scan signals in a single frequency mode and a multi-frequency mode, according to one or more embodiments of the present disclosure.

FIG. 7 shows an example of scan signals GB1 to GB3840 in the single frequency mode SFM and the multi-frequency mode MFM, according to one or more embodiments of the present disclosure.

FIG. 7 illustrates 3840 scan signals GB1 to GB3840, but the present disclosure is not limited thereto. A number of scan signals GB1 to GB3840 may vary depending on the size and the resolution of the display panel DP.

Referring to FIGS. 4 and 7, in the single frequency mode SFM, the frequency of the scan signals GB1 to GB3840 may be 120 Hz. In the multi-frequency mode MFM, the frequency of the scan signals GB1 to GB3840 may be 120 Hz. In other words, in the multi-frequency mode MFM, the frequency of the scan signals GB1 to GB3840 may be the same as that of the single frequency mode SFM.

In an embodiment, in the multi-frequency mode MFM, among the scan signals GB1 to GB3840, the scan signals GB1 to GB1920 may correspond to the first display area DA1 of the electronic device ED illustrated in FIG. 1, and the scan signals GB1921 to GB3840 may correspond to the second display area DA2 of the electronic device ED illustrated in FIG. 1.

In an embodiment, in the single frequency mode SFM as well as the multi-frequency mode MFM, the frequency of the emission signals EM1*a* to EMna and EM1*b* to EMnb illustrated in FIG. 4 may be 120 Hz, which is the same as that of the scan signals GB1 to GB3840.

Figure 8A:
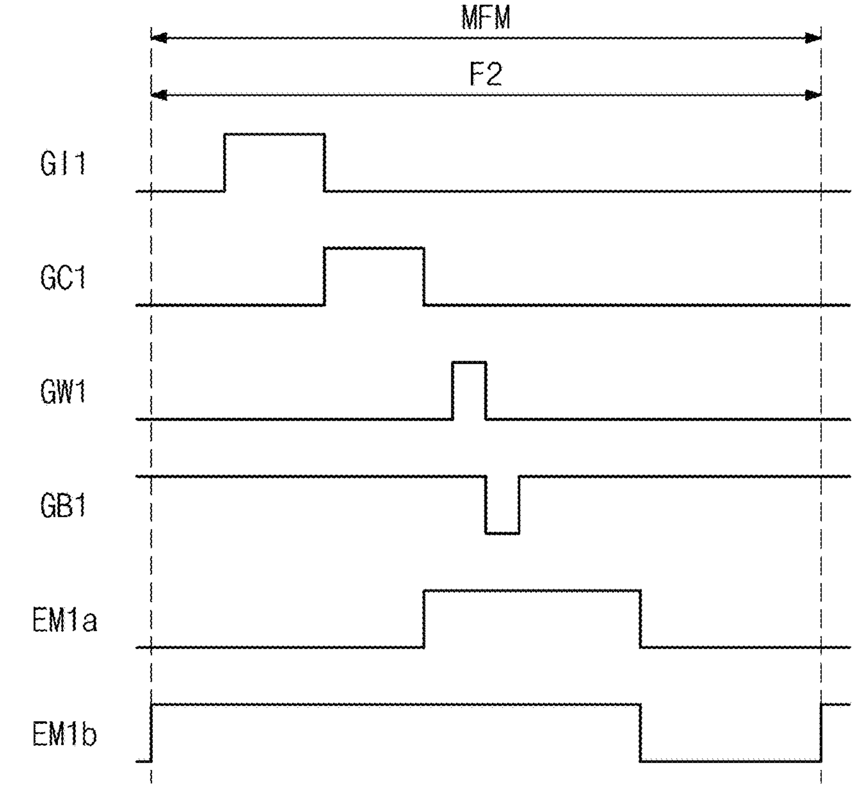
FIG. 8A is a timing diagram for describing an operation of a pixel in a second frame of a multi-frequency mode, according to one or more embodiments of the present disclosure.

FIG. 8A is a timing diagram for describing an operation of the pixel PX in the second frame F2 of the multi-frequency mode MFM, according to one or more embodiments of the present disclosure.

In an embodiment, it is assumed that 'j' is 1. That is, FIG. 8A is a timing diagram for describing an operation of the pixel PX connected to the first scan lines GIL1, GCL1, GWL1, and GBL1 and the emission control lines EML1*a* and EML1*b* corresponding to the first display area DA1 (refer to FIG. 1).

Referring to FIGS. 5 and 8A, the scan signal GI1 of a high level may be provided through the scan line GIL1 during a first period in the second frame F2. When the fourth transistor T4 is turned on in response to the scan signal GI1 of a high level, the first initialization voltage VINT may be supplied to the gate electrode of the first transistor T1 through the fourth transistor T4 to initialize the first transistor T1.

When the scan signal GC1 of the high level is supplied through the scan line GCL1 during a second period in the second frame F2, the third transistor T3 and the fifth transistor T5 may be turned on. The first transistor T1 may be diode-connected by the third transistor T3 thus turned on to be forward-biased when the third transistor T3 is turned on. In the second period, because the emission signal EM1*a* is at a low level, a voltage lowered by a threshold voltage of the first transistor T1 from the first driving voltage ELVDD may be provided to the second node N2 (e.g., a second electrode of the capacitor Cst). Moreover, during the second period, the reference voltage VREF may be delivered to the first node N1 through the fifth transistor T5 when the fifth transistor T5 is turned on.

When the scan signal GW1 of a high level is supplied through the scan line GWL1 during a third period in the second frame F2, the second transistor T2 may be turned on. Then, the data signal Di supplied from the data line DLi may be delivered to the first node N1 (e.g., a first electrode of the capacitor Cst) through the second transistor T2.

When the scan signal GB1 of a low level is supplied through the scan line GBL1 during a fourth period in the second frame F2, the eighth transistor T8 and the ninth transistor T9 may be turned on. As the eighth transistor T8 is turned on, the anode of the light emitting element ED may be initialized to the second initialization voltage VAINT. As the ninth transistor T9 is turned on, the bias voltage Vbias may be provided to the first electrode of the first transistor T1.

When both the emission signals EM1*a* and EM1*b* are at low levels during a fifth period in the second frame F2, the sixth transistor T6 and the seventh transistor T7 may be turned on. As the sixth transistor T6 and the seventh transistor T7 are turned on, a driving current according to a voltage difference between a gate voltage of the gate electrode of the first transistor T1 and the first driving voltage ELVDD may be generated and supplied to the light emitting element ED through the seventh transistor T7, and thus the light emitting element ED may emit light.

Figure 8B:
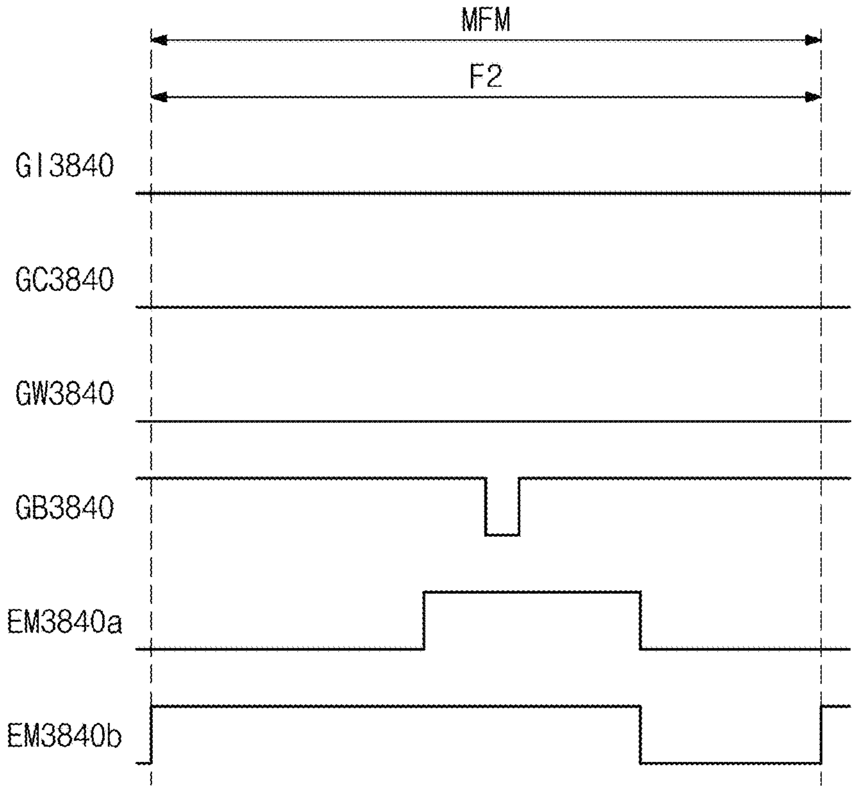
FIG. 8B is a timing diagram for describing an operation of a pixel in a second frame of a multi-frequency mode, according to one or more embodiments of the present disclosure.

FIG. 8B is a timing diagram for describing an operation of the pixel PX in the second frame F2 of the multi-frequency mode MFM, according to one or more embodiments of the present disclosure.

In an embodiment, it is assumed that 'j' is 3840. That is, FIG. 8B is a timing diagram for describing an operation of the pixel PX connected to the 3840th scan lines GIL3840, GCL3840, GWL3840, and GBL3840 and the emission control lines EML3840*a* and EML3840*b* corresponding to the second display area DA2 (refer to FIG. 1).

Referring to FIGS. 5 and 8B, during the second frame F2, all of the scan signals GI3840, GC3840, and GW3840 may be maintained at low levels. As a result, the second, third, fourth, and fifth transistors T2, T3, T4, and T5 remain turned off.

When the scan signal GB3840 of a low level is supplied through the scan line GBL1, the eighth transistor T8 and the ninth transistor T9 may be turned on. As the eighth transistor T8 is turned on, the anode of the light emitting element ED may be initialized to the second initialization voltage VAINT. As the ninth transistor T9 is turned on, the bias voltage Vbias may be provided to the first electrode of the first transistor T1.

When both the emission signals EM1*a* and EM1*b* are at low levels, the sixth transistor T6 and the seventh transistor T7 may be turned on. As the sixth transistor T6 and the seventh transistor T7 are turned on, the driving current according to the voltage difference between the gate voltage of the gate electrode of the first transistor T1 and the first driving voltage ELVDD may be generated and supplied to the light emitting element ED through the seventh transistor T7, and thus the light emitting element ED may emit light.

As shown in FIGS. 8A and 8B, in the second frame F2 of the multi-frequency mode MFM, as the pixel PX corresponding to the first display area DA1 has the scan signals GI1, GC1, GW1, and GB1 transitioning to an active level, the second, third, fourth, fifth, and ninth transistors T2, T3, T4, T5, T9 may be turned on, and thus various voltages may be applied to the first electrode, the second electrode, and the gate electrode of the first transistor T1, thereby increasing a stress of the first transistor T1.

On the other hand, in the second frame F2 of the multi-frequency mode MFM, as the scan signal GB3840 transitions to an active level, the ninth transistor T9 may be turned on in the pixel PX corresponding to the second display area DA2, and the bias voltage Vbias may be provided to the first electrode of the first transistor T1. Accordingly, the stress of the first transistor T1 in the pixel PX of the first display area DA1 is higher than the stress of the first transistor T1 in the pixel PX of the second display area DA2.

Figure 9A:
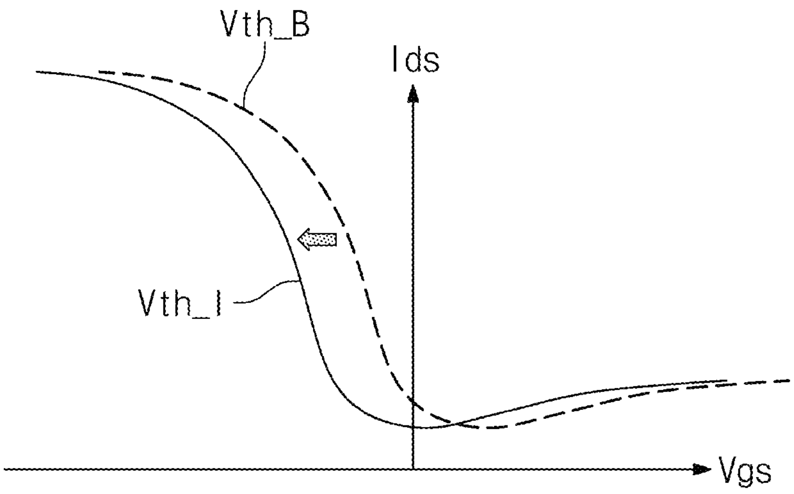
FIGS. 9A and 9B are diagrams showing a change in a threshold voltage of a first transistor according to an operation of a pixel, according to one or more embodiments of the present disclosure.
Figure 9B:
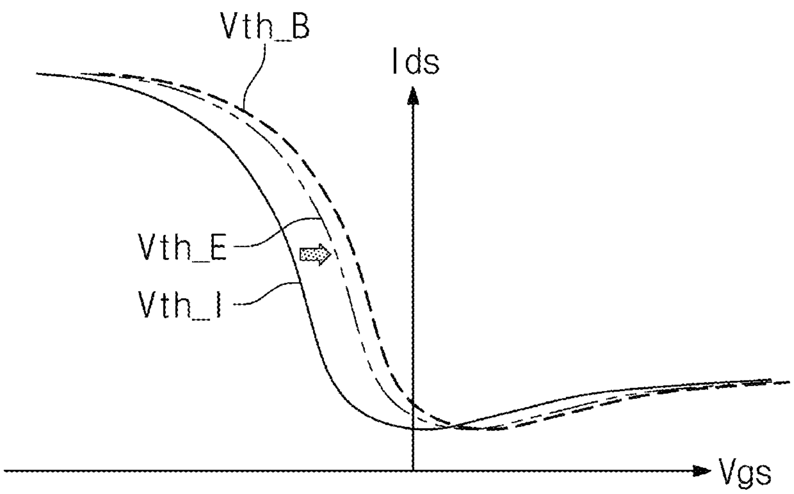

FIGS. 9A and 9B are diagrams showing a change in a threshold voltage of the first transistor T1 according to an operation of the pixel PX, according to one or more embodiments of the present disclosure.

Referring to FIGS. 5 and 9A, the threshold voltage of the first transistor T1 may be initially referred to as a "base threshold voltage Vth_B". When the first initialization voltage VINT is provided to the gate electrode of the first transistor T1, a gate-source voltage Vgs of the first transistor T1 may be a voltage lower than 0 V. In this case, the threshold voltage of the first transistor T1 may change from the base threshold voltage Vth_B to a first threshold voltage Vth_I, which is negatively shifted.

Referring to FIGS. 5 and 9B, when both the emission signals EMja and EMjb transition to low levels, the gate-source voltage Vgs of the first transistor T1 may be 0 V. In the case, the threshold voltage of the first transistor T1 may change to a second threshold voltage Vth_E.

An extent to which the threshold voltage of the first transistor T1 is changed from the first threshold voltage Vth_I to the second threshold voltage Vth_E may be determined by a stress level of the first transistor T1.

Figure 10:
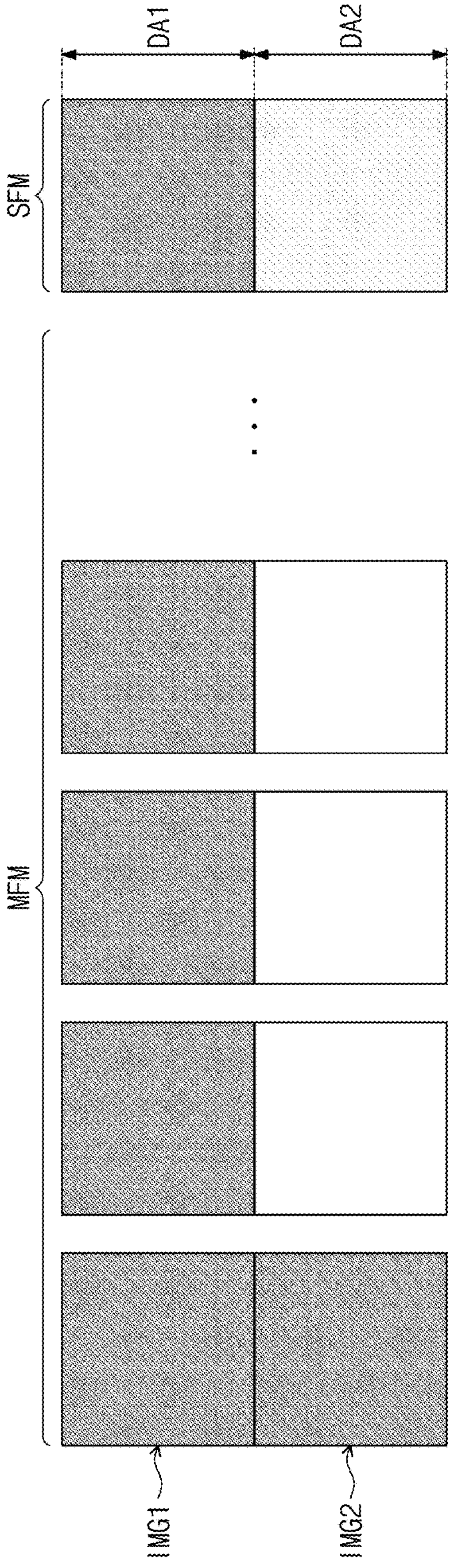
FIG. 10 shows an image displayed on a display panel in a single frequency mode and a multi-frequency mode, according to one or more embodiments of the present disclosure.

FIG. 10 shows an image displayed on a display panel in the single frequency mode SFM and the multi-frequency mode MFM, according to one or more embodiments of the present disclosure.

Referring to FIG. 10, in the multi-frequency mode MFM, a first image IMG1 may be displayed in the first display area DA1, and a second image IMG2 may be displayed in the second display area DA2. The pixels PX of the first display area DA1 (refer to FIG. 5) may be driven at a first frequency, and the pixels PX of the second display area DA2 (refer to FIG. 5) may be driven at a frequency lower than the first frequency.

Referring to FIGS. 5, 9A, 9B, and 10, when a stress deviation (or stress difference) between the first transistor T1 in the pixel PX of the first display area DA1 and the first transistor T1 in the pixel PX of the second display area DA2 is greater, a deviation between the second threshold voltage Vth_E of the first transistor T1 in the pixel PX of the first display area DA1 and the second threshold voltage Vth_E of the first transistor T1 in the pixel PX of the second display area DA2 may increase.

Even when an operating mode is changed to the single frequency mode SFM after the multi-frequency mode MFM is maintained for a long time, and an image having the same grayscale is displayed on the first display area DA1 and the second display area DA2, there may be a difference in luminance between the first display area DA1 and the second display area DA2. This may be due to a difference between the second threshold voltage Vth_E of the first transistor T1 in the pixel PX of the first display area DA1 and the second threshold voltage Vth_E of the first transistor T1 in the pixel PX of the second display area DA2.

Figure 11:
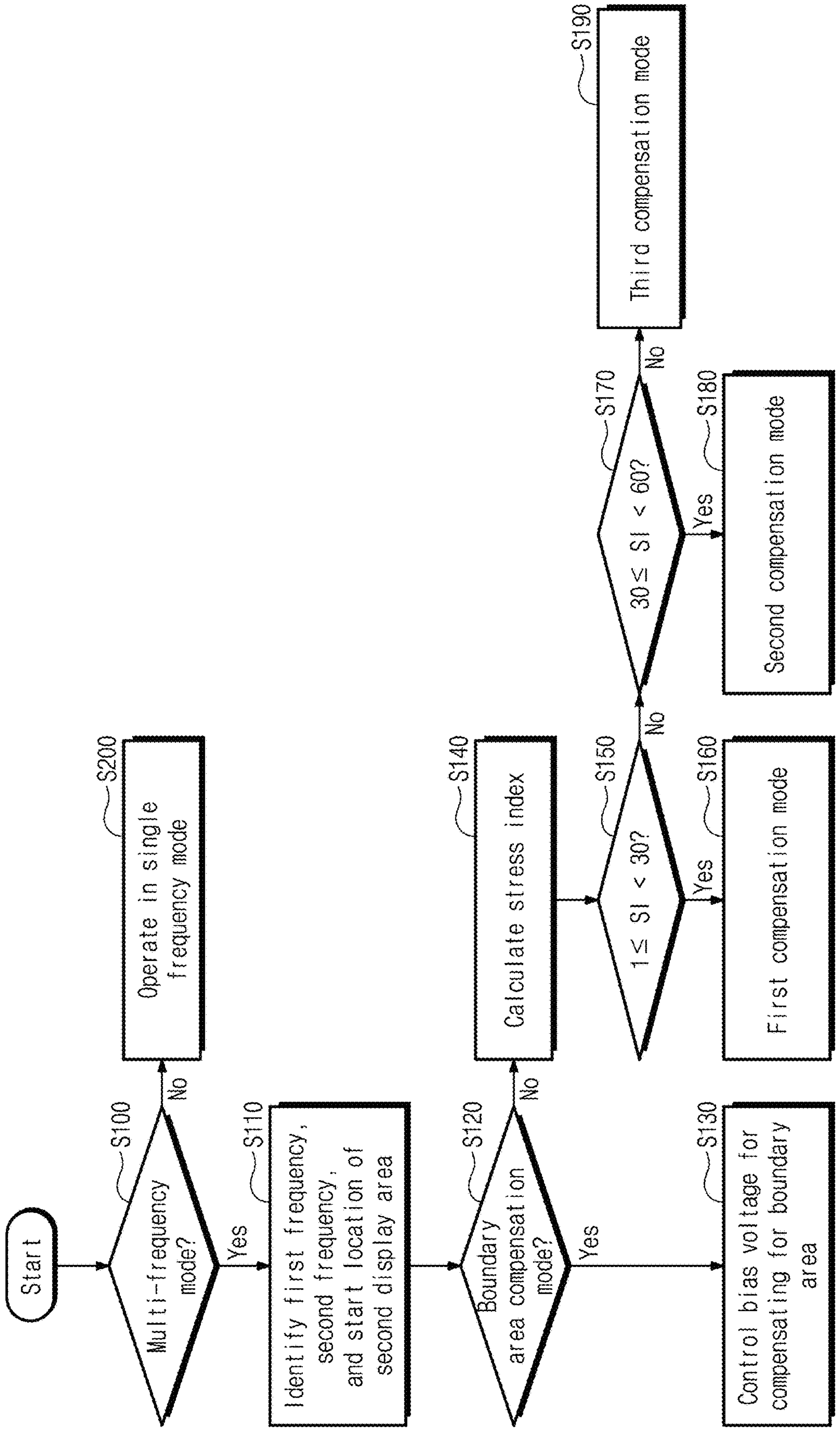
FIG. 11 is a flowchart showing an operation of a driving controller in an electronic device, according to one or more embodiments of the present disclosure.

FIG. 11 is a flowchart showing an operation of the driving controller 100 in an electronic device, according to one or more embodiments of the present disclosure.

Referring to FIGS. 4 and 11, the driving controller 100 may determine an operating mode based on the image signal RGB and the control signal CTRL (operation S100).

In an embodiment, the driving controller 100 may determine the operating mode based on mode information included in the control signal CTRL. In an embodiment, the driving controller 100 may determine the operating mode depending on a pattern of the image signal RGB.

When the determined operating mode is a multi-frequency mode, the driving controller 100 may identify a first frequency of the first display area DA1, a second frequency of the second display area DA2, and a start location of the second display area DA2 (operation S110).

When the determined operating mode is not the multi-frequency mode, the driving controller 100 may operate in a single frequency mode (operation S200).

In the multi-frequency mode, the driving controller 100 may operate in a compensation mode for compensating for a luminance difference between the first display area DA1 and the second display area DA2. The compensation mode may include a boundary area compensation mode and a normal compensation mode. The driving controller 100 may operate in one of the boundary area compensation mode and the normal compensation mode.

The driving controller 100 may operate in a predetermined compensation mode or may select a compensation mode based on compensation mode information included in the control signal CTRL.

When the predetermined compensation mode is the boundary area compensation mode, the driving controller 100 may control the bias voltage Vbias for compensating for a boundary area (e.g., BR in FIG. 12) (operation S130). In an embodiment, in the boundary area compensation mode, the driving controller 100 may provide the voltage generator 300 with the voltage control signal VCTRL for controlling the bias voltage Vbias. The voltage generator 300 may change the voltage level of the bias voltage Vbias in response to the voltage control signal VCTRL.

Figure 12:
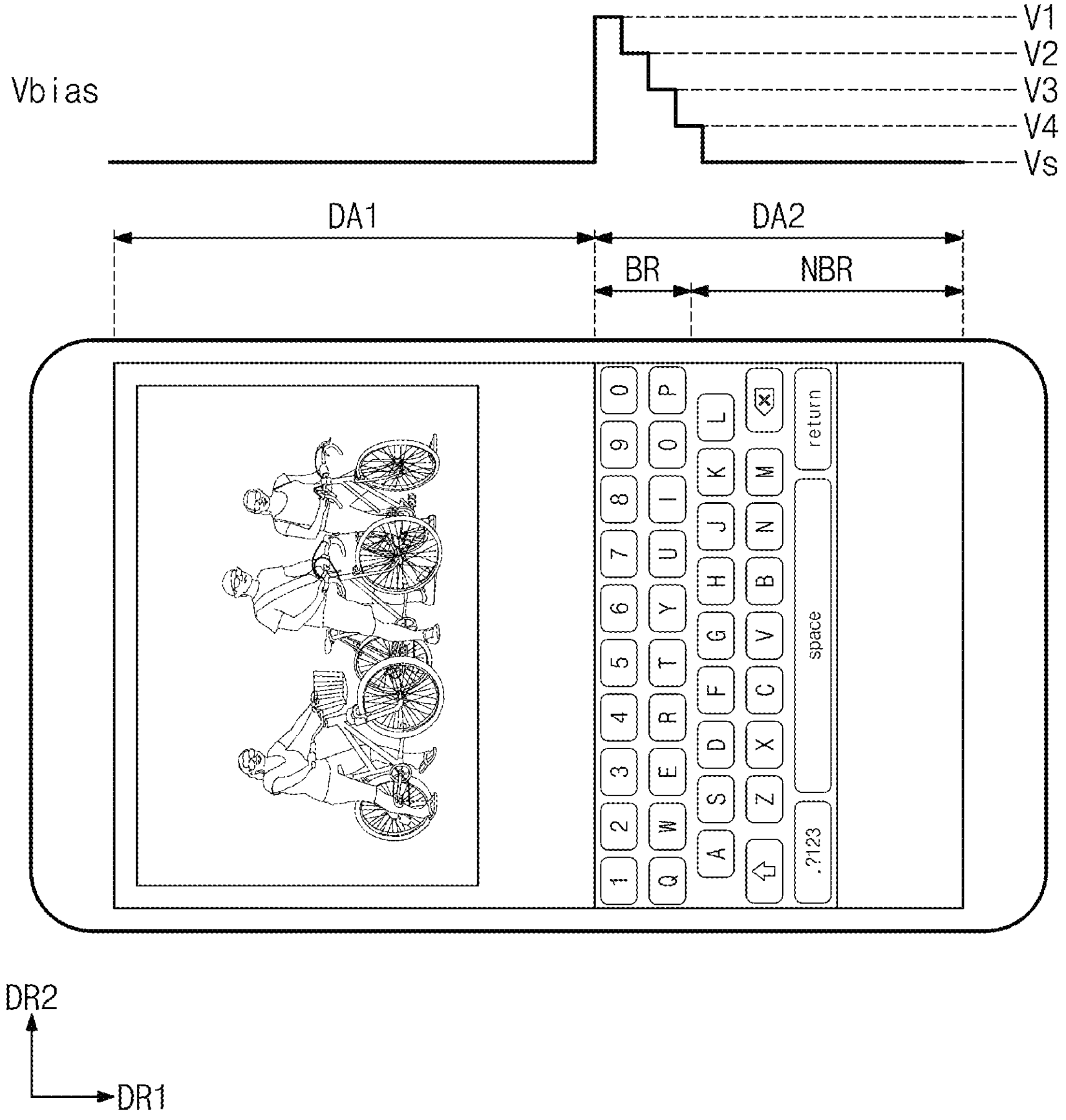
FIG. 12 is a diagram showing a voltage level of a bias voltage in a boundary area compensation mode, according to one or more embodiments of the present disclosure.

FIG. 12 is a diagram showing a voltage level of the bias voltage Vbias in a boundary area compensation mode, according to one or more embodiments of the present disclosure.

Referring to FIG. 12, when the first display area DA1 is driven in the boundary area compensation mode, the bias voltage Vbias may have a default bias voltage level Vs.

In the boundary area compensation mode, the second display area DA2 may include a boundary area BR and a non-boundary area NBR. The boundary area BR may be an area adjacent to the first display area DA1 in the second display area DA2.

In the boundary area compensation mode, when the boundary area BR among the second display area DA2 is driven, the bias voltage Vbias may have a compensation voltage level different from the default bias voltage level Vs. In an embodiment, the compensation voltage level may include a first voltage level V1, a second voltage level V2, a third voltage level V3 and a fourth voltage level V4. When the boundary area BR is driven, the bias voltage Vbias may be sequentially changed to the first voltage level V1, the second voltage level V2, the third voltage level V3, the fourth voltage level V4, and the default bias voltage level Vs. In an embodiment, the first voltage level V1, the second voltage level V2, the third voltage level V3, the fourth voltage level V4 may have a relationship of "V1>V2>V3>V4>Vs". In other words, at the start location of the second display area DA2, the bias voltage Vbias may have a highest first voltage level V1 and decrease stepwise.

In the non-boundary area NBR, the bias voltage Vbias may have the same default bias voltage level Vs, which is a level of the bias voltage Vbias that is applied when the first display area DA1 is driven. However, this is only an example and the present disclosure is not limited thereto. In an embodiment, in the non-boundary area NBR, the bias voltage Vbias may have a higher voltage level than the default bias voltage level Vs.

The driving controller 100 illustrated in FIG. 4 may output the voltage control signal VCTRL such that the bias voltage Vbias has any one of the first voltage level V1, the second voltage level V2, the third voltage level V3, the fourth voltage level V4, and the default bias voltage level Vs. The voltage generator 300 may generate the bias voltage Vbias having a voltage level corresponding to the voltage control signal VCTRL.

In the pixel PX shown in FIG. 5, the bias voltage Vbias may be provided to the first electrode of the first transistor T1. As the bias voltage Vbias provided to the first electrode of the first transistor T1 is higher, the stress of the first transistor T1 increases.

As described above, because the stress level of the first transistor T1 in the pixel PX of the second display area DA2 is lower than the stress level of the first transistor T1 in the pixel PX of the first display area DA1, a luminance deviation may occur between the first display area DA1 and the second display area DA2. In an embodiment of the present disclosure, when the voltage level of the bias voltage Vbias provided to the pixel PX of the second display area DA2 increases, the stress level of the first transistor T1 in the pixel PX of the second display area DA2 increases, thereby minimizing the luminance deviation between the first display area DA1 and the second display area DA2.

In particular, a difference in luminance in the boundary area BR, which is perceived by a user, may be reduced by increasing a voltage level of the bias voltage Vbias in the boundary area BR of the second display area DA2 adjacent to the first display area DA1.

Returning to FIG. 11, when the predetermined compensation mode is not the boundary area compensation mode (e.g., when the predetermined compensation mode is a normal compensation mode) in operation S120, the driving controller 100 may calculate a stress index SI (operation S140). The stress index SI may be determined based on the first frequency of the first display area DA1 and the second frequency of the second display area DA2. In an embodiment, the stress index SI may be calculated based on a ratio between the first frequency and the second frequency (e.g., (first frequency)/(second frequency)). For example, when the first frequency is 120 Hz and the second frequency is 1 Hz, the stress index may be 120. The driving controller 100 may determine the compensation mode based on the stress index SI.

Table 1 shows examples of the stress index SI and a compensation mode according to the first frequency and the second frequency.

TABLE 1

| First frequency | Second frequency | Stress index SI | Compensation mode |
|---|---|---|---|
| 120 Hz | Greater than 4 Hz and 120 Hz or less | Greater than or equal to 1 and less than 30 | First compensation mode |
| 120 Hz | Greater than 2 Hz and 4 Hz or less | Greater than or equal to 30 and less than 60 | Second compensation mode |
| 120 Hz | Greater than 1 Hz and 2 Hz or less | Greater than 60 and less than 120 | Third compensation mode |

When the stress index SI is greater than or equal to 1 and less than 30 ('Yes' in operation S150), the driving controller 100 may operate in a first compensation mode (operation S160).

When the stress index SI is greater than or equal to 30 and less than 60 ('Yes' in operation S170), the driving controller 100 may operate in a second compensation mode (operation S180).

When the stress index SI is greater than or equal to 60 ('No' in operation S170), the driving controller 100 may operate in a third compensation mode (operation S190).

Figure 13:
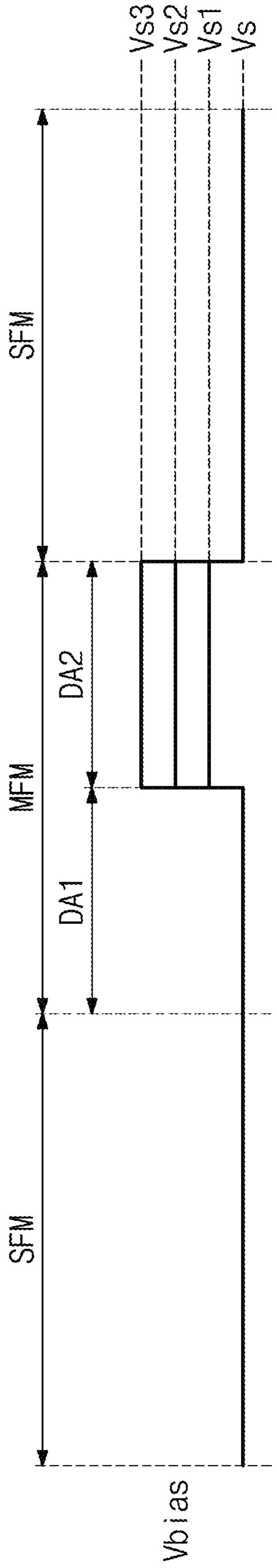
FIG. 13 is a diagram showing a voltage level of a bias voltage during first, second, and third compensation modes, according to one or more embodiments of the present disclosure.

FIG. 13 is a diagram showing a voltage level of the bias voltage Vbias during the first, second, and third compensation modes, according to one or more embodiments of the present disclosure.

Referring to FIGS. 12 and 13, during the single frequency mode SFM, the bias voltage Vbias may have the default bias voltage level Vs.

When the first display area DA1 is driven in the multi-frequency mode MFM, the bias voltage Vbias may have the default bias voltage level Vs.

When the second display area DA2 is driven in the first compensation mode of the multi-frequency mode MFM, the bias voltage Vbias may have a first compensation voltage level Vs1.

When the second display area DA2 is driven in the second compensation mode of the multi-frequency mode MFM, the bias voltage Vbias may have a second compensation voltage level Vs2.

When the second display area DA2 is driven in the third compensation mode of the multi-frequency mode MFM, the bias voltage Vbias may have a third compensation voltage level Vs3.

That is, as a difference between the first frequency of the first display area DA1 and the second frequency of the second display area DA2 is greater when the second display area DA2 is driven in the multi-frequency mode MFM, the voltage level of the bias voltage Vbias for the second display area DA2 in the multi-frequency mode MFM is higher. Accordingly, the luminance deviation according to the difference between the first frequency of the first display area DA1 and the second frequency of the second display area DA2 may be minimized.

Figure 14:
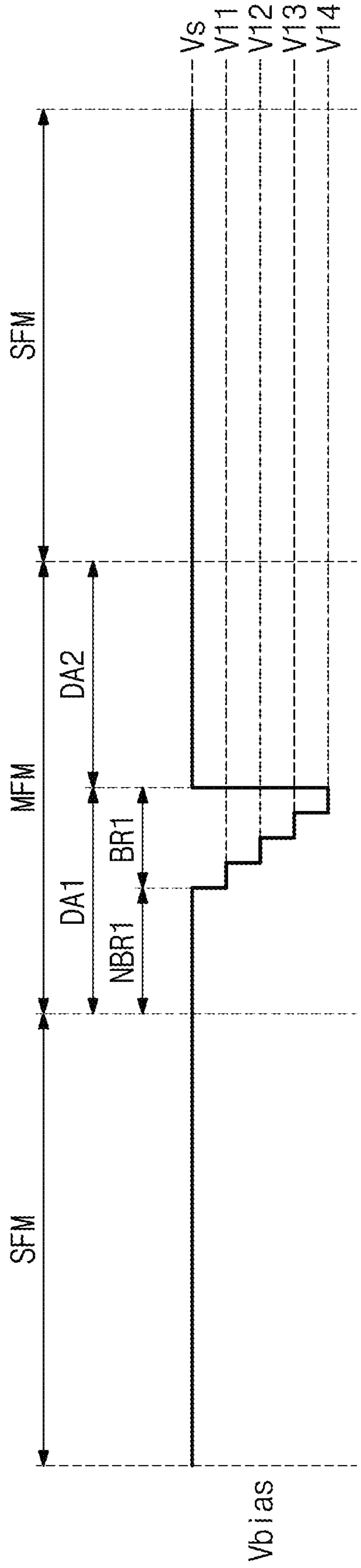
FIG. 14 is a diagram showing a voltage level of a bias voltage according to an operating mode, according to one or more embodiments of the present disclosure.

FIG. 14 is a diagram showing a voltage level of the bias voltage Vbias according to an operating mode, according to one or more embodiments of the present disclosure.

Referring to FIG. 14, during the single frequency mode SFM, the bias voltage Vbias may have the default bias voltage level Vs.

In the multi-frequency mode MFM, the first display area DA1 may be divided into a boundary area BR1 adjacent to a non-boundary area NBR1 of the first display area DA1 and the second display area DA2. The boundary area BR1 of the first display area DA1 may be between a non-boundary area NBR1 of the first display area DA1 and the second display area DA2. When the boundary area BR1 within the first display area DA1 is driven, the bias voltage Vbias is gradually lowered from the default bias voltage level Vs to an eleventh voltage level V11, a twelfth voltage level V12, a thirteenth voltage level V13, and a fourteenth voltage level V14.

When the second display area DA2 is driven in the multi-frequency mode MFM, the bias voltage Vbias may have the default bias voltage level Vs.

The luminance deviation between the first display area DA1 and the second display area DA2 may be clearly visible to a user at portions adjacent to the first display area DA1 and the second display area DA2, if the bias voltage Vbias is not controlled in the boundary area BR1 between the first display area DA1 and the second display area DA2. When the boundary area BR1, which is adjacent to the second display area DA2, from among the first display area DA1 is driven, a stress level of the first transistor T1 (refer to FIG. 5) in the pixel PX (refer to FIG. 5) may be reduced by gradually lowering the bias voltage Vbias. As a result, a luminance deviation may be minimized in the portions adjacent to the first display area DA1 and the second display area DA2.

Figure 15:
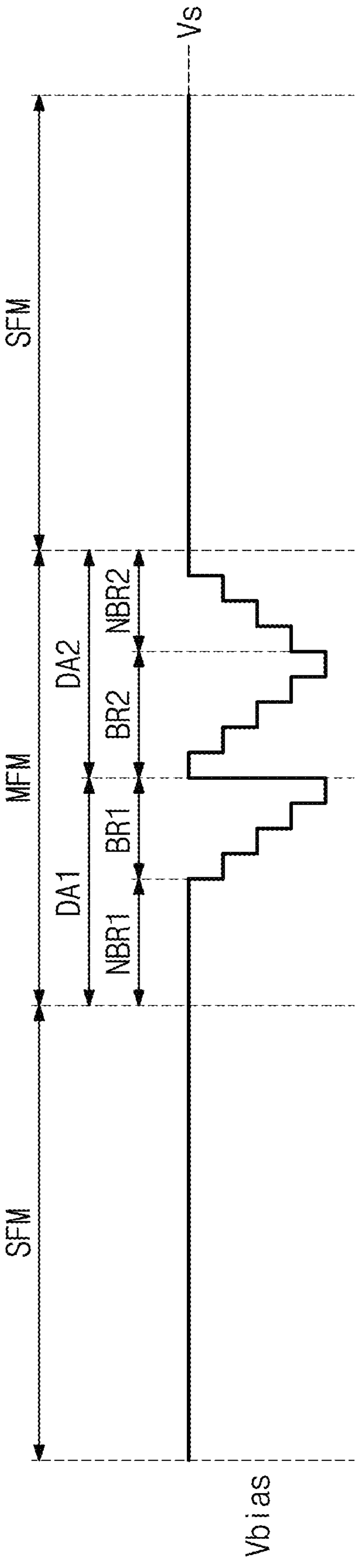
FIG. 15 is a diagram showing a voltage level of a bias voltage according to an operating mode, according to one or more embodiments of the present disclosure.

FIG. 15 is a diagram showing a voltage level of the bias voltage Vbias according to an operating mode, according to one or more embodiments of the present disclosure.

Referring to FIG. 15, during the single frequency mode SFM, the bias voltage Vbias may have the default bias voltage level Vs.

In the multi-frequency mode MFM, the first display area DA1 may be divided into the boundary area BR1 adjacent to the non-boundary area NBR1 of the first display area DA1 and the second display area DA2. The boundary area BR1 of the first display area DA1 may be between the non-boundary area NBR1 of the first display area DA1 and the second display area DA2. When the boundary area BR1 in the first display area DA1 is driven, the bias voltage Vbias may be lowered from the default bias voltage level Vs stepwise.

In the multi-frequency mode MFM, the second display area DA2 may be divided into a boundary area BR2 adjacent to a non-boundary area NBR2 of the second display area DA2 and the first display area DA1. The boundary area BR2 of the second display area DA2 may be between the non-boundary area NBR2 of the second display area DA2 and the first display area DA1. When the boundary area BR2, which is adjacent to the first display area DA1, from among the second display area DA2 is driven in the multi-frequency mode MFM, the bias voltage Vbias may be lowered from the default bias voltage level Vs stepwise. Accordingly, the luminance deviation may be minimized in the boundary areas BR1 and BR2.

When the non-boundary area NBR2 of the second display area DA2 is driven, the bias voltage Vbias may increase again step by step and then becomes the default bias voltage level Vs. When the second display area DA2 may be turned off and the first display area DA1 may be turned on again, the voltage level of the bias voltage Vbias may be the default bias voltage level Vs. Accordingly, display quality degradation according to rapid changes in the bias voltage Vbias may be prevented.

Figure 16:
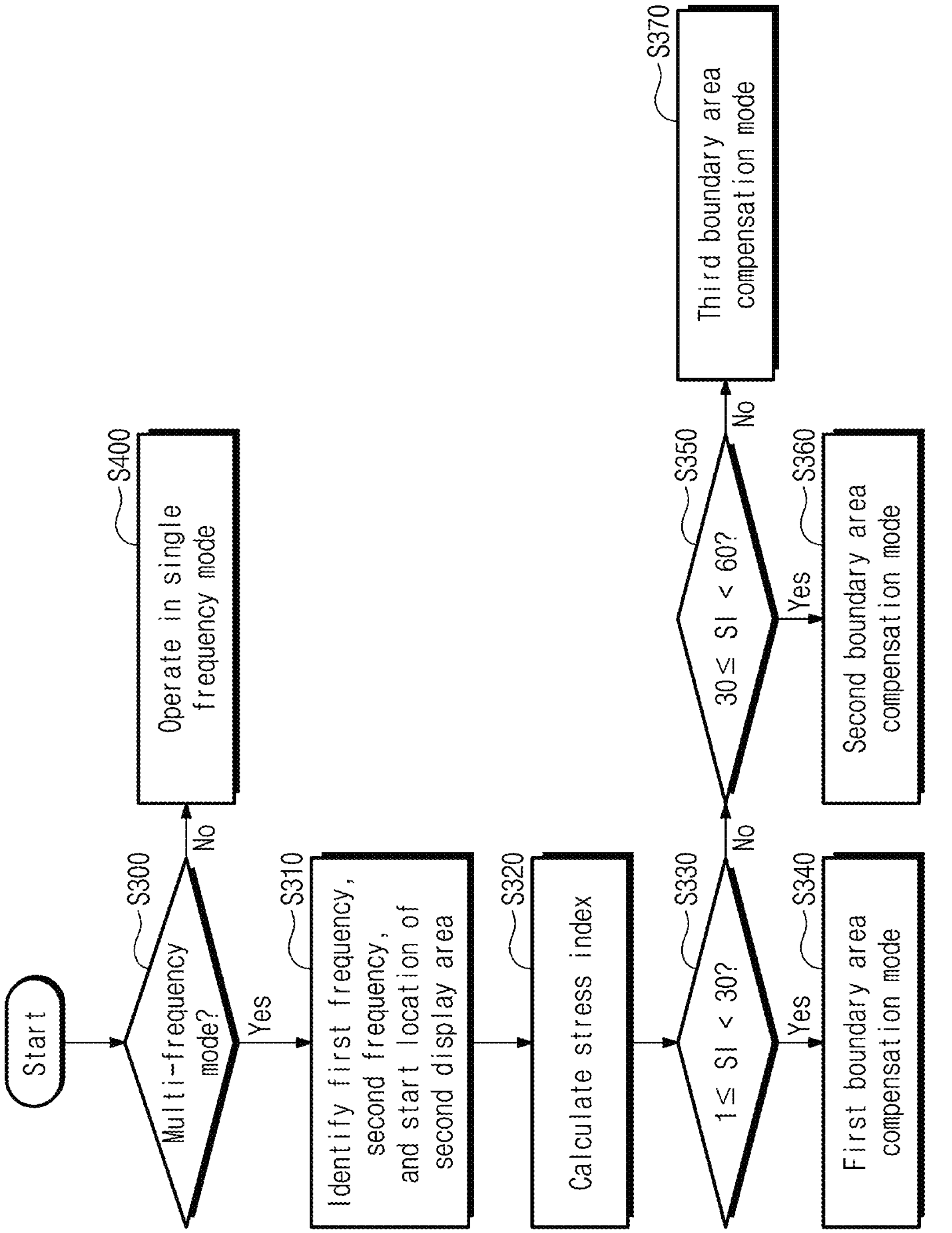
FIG. 16 is a flowchart showing an operation of a driving controller in an electronic device, according to one or more embodiments of the present disclosure.

FIG. 16 is a flowchart showing an operation of the driving controller 100 in an electronic device, according to one or more embodiments of the present disclosure.

Referring to FIGS. 4 and 16, the driving controller 100 may determine an operating mode based on the image signal RGB and the control signal CTRL (operation S300).

In an embodiment, the driving controller 100 may determine the operating mode based on mode information included in the control signal CTRL. In an embodiment, the driving controller 100 may determine the operating mode depending on the pattern of the image signal RGB.

When the determined operating mode is a multi-frequency mode, the driving controller 100 may identify a first frequency of the first display area DA1, a second frequency of the second display area DA2, and a start location of the second display area DA2 (operation S310).

When the determined operating mode is not the multi-frequency mode, the driving controller 100 may operate in a single frequency mode (operation S400).

In the multi-frequency mode, the driving controller 100 may operate in a compensation mode for compensating for the luminance difference between the first display area DA1 and the second display area DA2. In an embodiment, the compensation mode may be a boundary area compensation mode.

The driving controller 100 may calculate the stress index SI (operation S320). The stress index SI may be determined based on the first frequency of the first display area DA1 and the second frequency of the second display area DA2. In an embodiment, the stress index SI may be calculated based on a ratio between the first frequency and the second frequency (e.g., (first frequency)/(second frequency)). For example, when the first frequency is 120 Hz and the second frequency is 1 Hz, the stress index may be 120. The driving controller 100 may determine the compensation mode based on the stress index SI.

Table 2 shows examples of the stress index SI and a boundary area compensation mode according to the first frequency and the second frequency.

TABLE 2

| First frequency | Second frequency | Stress index SI | Boundary area compensation mode |
|---|---|---|---|
| 120 Hz | Greater than 4 Hz and 120 Hz or less | Greater than or equal to 1 and less than 30 | First boundary area compensation mode |
| 120 Hz | Greater than 2 Hz and 4 Hz or less | Greater than or equal to 30 and less than 60 | Second boundary area compensation mode |
| 120 Hz | Greater than 1 Hz and 2 Hz or less | Greater than or equal to 60 and less than 120 | Third boundary area compensation mode |

When the stress index SI is greater than or equal to 1 and less than 30 (operation S330), the driving controller 100 may operate in a first boundary area compensation mode (operation S340).

When the stress index SI is greater than or equal to 30 and less than 60 (operation S350), the driving controller 100 may operate in a second boundary area compensation mode (operation S360).

When the stress index SI is greater than or equal to 60 (operation S350), the driving controller 100 may operate in a third boundary area compensation mode (operation S370).

Figure 17:
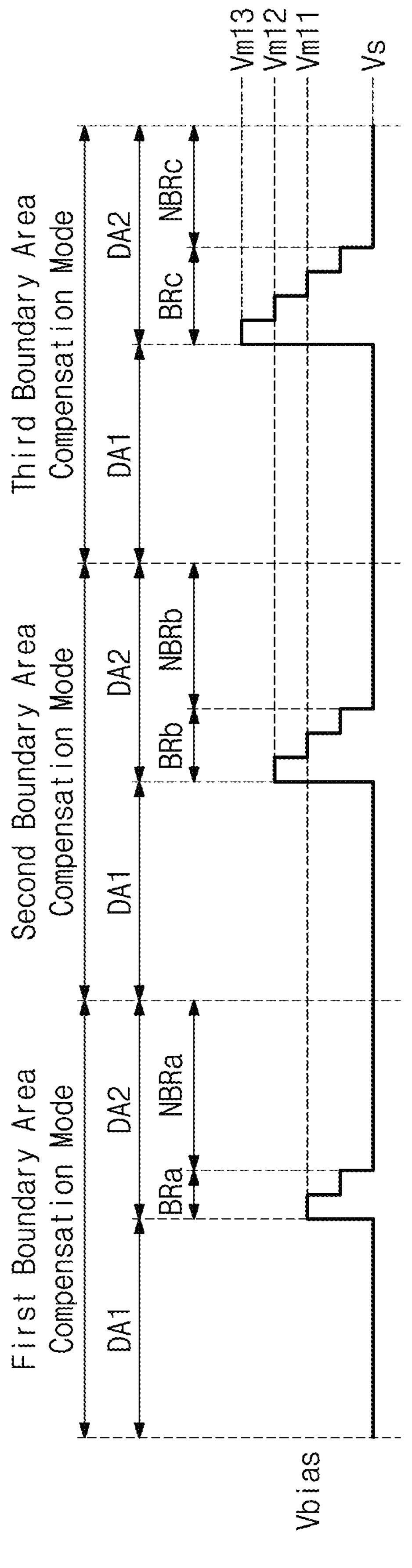
FIG. 17 is a diagram showing a voltage level of a bias voltage according to an operating mode, according to one or more embodiments of the present disclosure.

FIG. 17 is a diagram showing a voltage level of the bias voltage Vbias according to an operating mode, according to one or more embodiments of the present disclosure.

Referring to FIGS. 16 and 17, when the first display area DA1 is driven in a boundary area compensation mode, the bias voltage Vbias may have a default bias voltage level Vs.

During the first boundary area compensation mode, the second display area DA2 may include a boundary area BRa and a non-boundary area NBRa. The boundary area BRa of the second display area DA2 may be between the non-boundary area NBRa of the second display area DA2 and the first display area DA1. When the boundary area BRa within the second display area DA2 is driven in the first boundary area compensation mode, the bias voltage Vbias may be gradually lowered from an eleventh voltage level Vm11. In the non-boundary area NBRa, the bias voltage Vbias may have the same default bias voltage level Vs that is a level of the bias voltage Vbias applied when the first display area DA1 is driven.

During the second boundary area compensation mode, the second display area DA2 may include a boundary area BRb and a non-boundary area NBRb. The boundary area BRb of the second display area DA2 may be between the non-boundary area NBRb of the second display area DA2 and the first display area DA1. When the boundary area BRa within the second display area DA2 is driven in the second boundary area compensation mode, the bias voltage Vbias may be gradually lowered from a twelfth voltage level Vm12. In the non-boundary area NBRb, the bias voltage Vbias may have the same default bias voltage level Vs that is a level of the bias voltage Vbias applied when the first display area DA1 is driven.

During the third boundary area compensation mode, the second display area DA2 may include a boundary area BRc and a non-boundary area NBRc. The boundary area BRc of the second display area DA2 may be between the non-boundary area NBRc of the second display area DA2 and the first display area DA1. When the boundary area BRc within the second display area DA2 is driven in the first boundary area compensation mode, the bias voltage Vbias may be gradually lowered from a thirteenth voltage level Vm13. In the non-boundary area NBRc, the bias voltage Vbias may have the same default bias voltage level Vs that is a level of the bias voltage Vbias applied when the first display area DA1 is driven.

The eleventh voltage level Vm11, the twelfth voltage level Vm12, and the thirteenth voltage level Vm13 may have a relationship of “Vm11<Vm12<VM13”.

That is, as a difference between the first frequency of the first display area DA1 and the second frequency of the second display area DA2 is greater, a highest voltage level to which the bias voltage Vbias is controlled to changed may be higher in a boundary area. Accordingly, the luminance deviation between the first display area DA1 and the second display area DA2 may be minimized.

Although only the first to third boundary area compensation modes are illustrated and described in FIGS. 16 and 17, the present disclosure is not limited thereto. A number of boundary area compensation modes according to the stress index SI may be changed.

Figure 18:
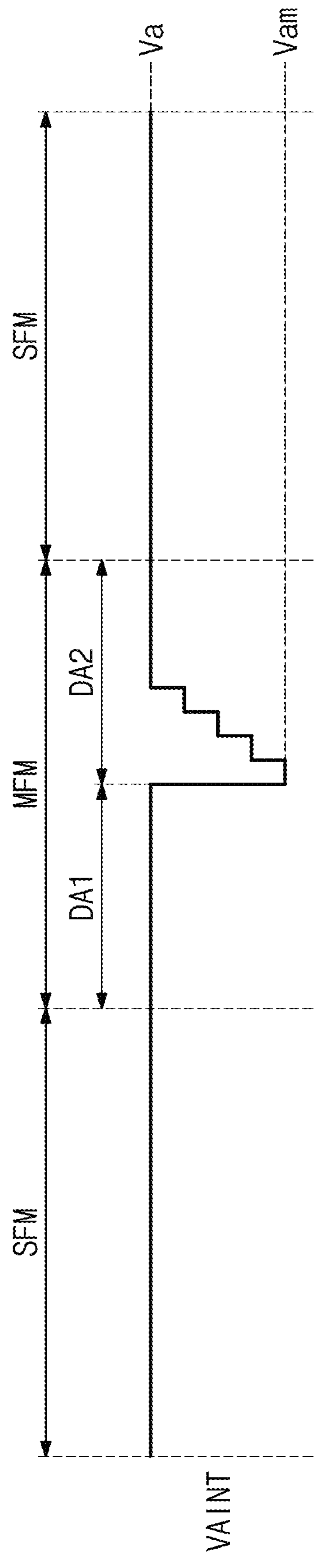
FIG. 18 is a diagram showing a second initialization voltage according to an operating mode, according to one or more embodiments of the present disclosure.

FIG. 18 is a diagram showing the second initialization voltage VAINT according to an operating mode, according to one or more embodiments of the present disclosure.

Referring to FIGS. 4 and 18, during the single frequency mode SFM, the second initialization voltage VAINT may have a default initialization voltage level Va. When the first display area DA1 is driven in the multi-frequency mode, the second initialization voltage VAINT may have the default initialization voltage level Va.

When the second display area DA2 is driven in the multi-frequency mode, the second initialization voltage VAINT may have a compensation initialization voltage level. The compensation initialization voltage level may be increased gradually from a minimum initialization voltage level Vam.

In the example shown in FIG. 10, the second frequency of the second display area DA2 may be lower than the first frequency of the first display area DA1. When an operating mode of the electronic device ED is changed from the multi-frequency mode MFM to the single frequency mode SFM, the luminance of the second display area DA2 may be brighter than the luminance of the first display area DA1. In particular, as a difference between the first frequency and the second frequency is greater, the luminance deviation between the first display area DA1 and the second display area DA2 may increase.

As shown in FIG. 5, as the voltage of the second initialization voltage VAINT in the pixel PX is low, the voltage level of the anode of the light emitting element ED may be lowered, and thus the light emission of the light emitting element ED may be delayed. Accordingly, when the second display area DA2 is driven, the voltage level of the second initialization voltage VAINT may be lowered to minimize the luminance deviation between the first display area DA1 and the second display area DA2.

Figure 19:
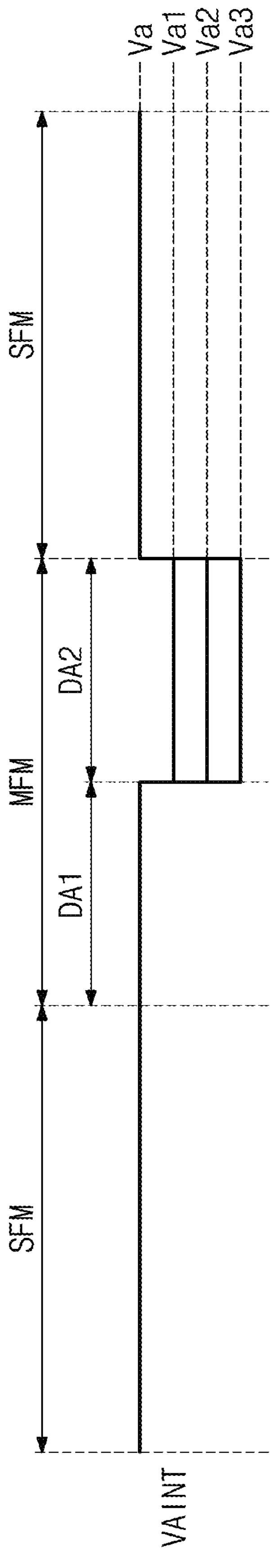
FIG. 19 is a diagram showing a second initialization voltage according to an operating mode, according to one or more embodiments of the present disclosure.

FIG. 19 is a diagram showing the second initialization voltage VAINT according to an operating mode, according to one or more embodiments of the present disclosure.

Referring to FIGS. 4 and 19, during the single frequency mode SFM, the second initialization voltage VAINT may have the default initialization voltage level Va. When the first display area DA1 is driven in the multi-frequency mode, the second initialization voltage VAINT may have the default initialization voltage level Va.

When the second display area DA2 is driven in the multi-frequency mode, the second initialization voltage VAINT may have one of a first initialization voltage level Va1, a second initialization voltage level Va2, and a third initialization voltage level Va3.

In an embodiment, as a difference between the first frequency of the first display area DA1 and the second frequency of the second display area DA2 is greater, a decrease in the voltage level of the second initialization voltage VAINT in the second display area DA2 may be greater.

In the example shown in FIG. 10, the second frequency of the second display area DA2 may be lower than the first frequency of the first display area DA1. When an operating mode of the electronic device ED is changed from the multi-frequency mode MFM to the single frequency mode SFM, the luminance of the second display area DA2 may be brighter than the luminance of the first display area DA1. In particular, as a difference between the first frequency and the second frequency is greater, the luminance deviation between the first display area DA1 and the second display area DA2 may increase.

As shown in FIG. 5, as the voltage of the second initialization voltage VAINT in the pixel PX is low, the voltage level of the anode of the light emitting element ED may be lowered, and thus the light emission of the light emitting element ED may be delayed. Accordingly, when the second display area DA2 is driven, the voltage level of the second initialization voltage VAINT may be lowered to minimize the luminance deviation between the first display area DA1 and the second display area DA2.

Figure 20:
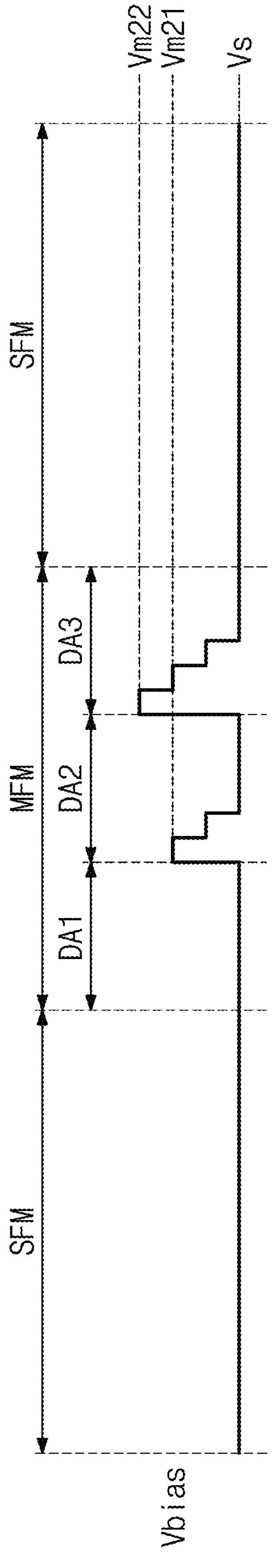
FIG. 20 is a diagram showing a bias voltage according to an operating mode, according to one or more embodiments of the present disclosure.

FIG. 20 is a diagram showing the bias voltage Vbias according to an operating mode, according to one or more embodiments of the present disclosure.

Referring to FIGS. 4 and 20, during the single frequency mode SFM, the bias voltage Vbias may have the default bias voltage level Vs. In the multi-frequency mode, the display area DA (refer to FIG. 1) may be divided into the first display area DA1, the second display area DA2, and a third display area DA3. In an embodiment, it is assumed that the first frequency of the first display area DA1, the second frequency of the second display area DA2, and a third frequency of the third display area DA3 have a relationship “first frequency>second frequency>third frequency”.

When the first display area DA1 is driven in the multi-frequency mode, the bias voltage Vbias may have the default bias voltage level Vs. When the second display area DA2 is driven in the multi-frequency mode, the bias voltage Vbias may be lowered stepwise from a 21st voltage level Vm21. When the third display area DA3 is driven in the multi-frequency mode, the bias voltage Vbias may be lowered stepwise from a 22nd voltage level Vm22. A difference between the first frequency and the third frequency may be greater than a difference between the first frequency and the second frequency, and thus the 22nd voltage level Vm22 may be higher than the 21st voltage level Vm21. Accordingly, a luminance deviation between the first display area DA1 and the second display area DA2 and a luminance deviation between the second display area DA2 and the third display area DA3 may be minimized.

Figure 21:
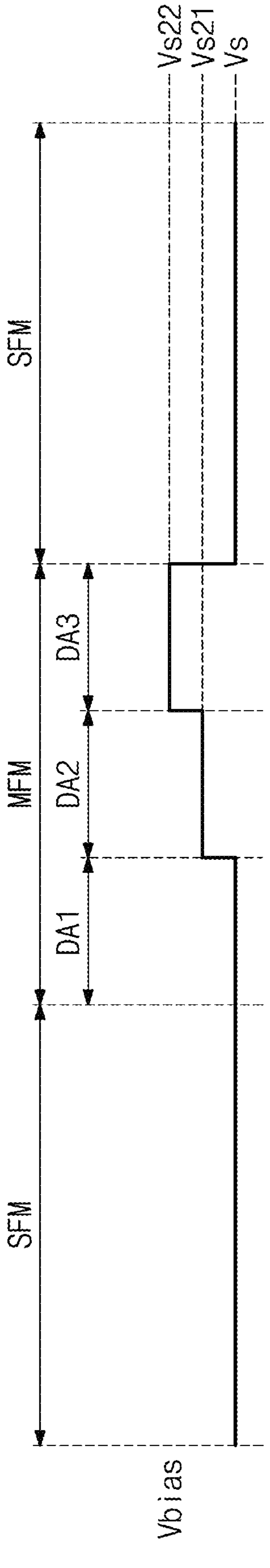
FIG. 21 is a diagram showing a bias voltage according to an operating mode, according to one or more embodiments of the present disclosure.

FIG. 21 is a diagram showing the bias voltage Vbias according to an operating mode, according to one or more embodiments of the present disclosure.

Referring to FIGS. 4 and 21, during the single frequency mode SFM, the bias voltage Vbias may have the default bias voltage level Vs. In the multi-frequency mode, the display area DA (refer to FIG. 1) may be divided into the first display area DA1, the second display area DA2, and the third display area DA3. In an embodiment, it is assumed that the first frequency of the first display area DA1, the second frequency of the second display area DA2, and the third frequency of the third display area DA3 have a relationship "first frequency>second frequency>third frequency".

When the first display area DA1 is driven in the multi-frequency mode, the bias voltage Vbias may have the default bias voltage level Vs. When the second display area DA2 is driven in the multi-frequency mode, the bias voltage Vbias may have a 21st voltage level Vs21. When the third display area DA3 is driven in the multi-frequency mode, the bias voltage Vbias may have a 22nd voltage level Vs22. A difference between the first frequency and the third frequency may be greater than a difference between the first frequency and the second frequency, and thus the 22nd voltage level Vs22 may be higher than the 21st voltage level Vs21. Accordingly, a luminance deviation between the first display area DA1 and the second display area DA2 and a luminance deviation between the second display area DA2 and the third display area DA3 may be minimized.

Figure 22:
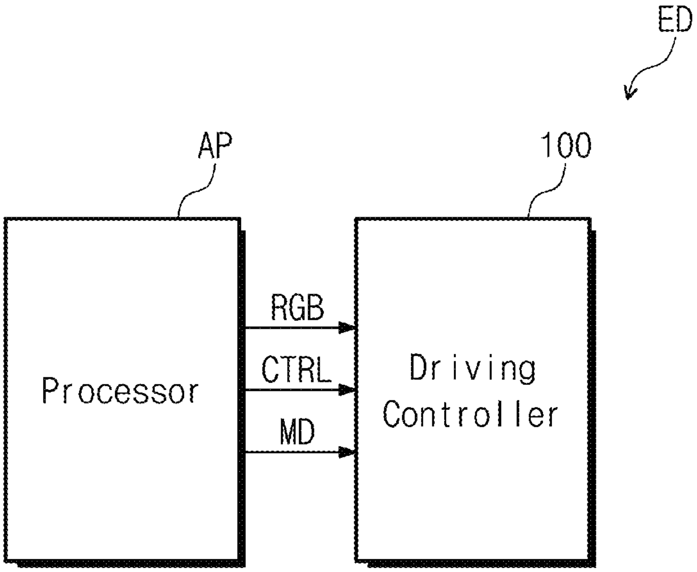
FIG. 22 is a block diagram showing some components of an electronic device, according to one or more embodiments of the present disclosure.

FIG. 22 is a block diagram showing some components of the electronic device ED, according to one or more embodiments of the present disclosure.

Referring to FIG. 22, the electronic device ED may include at least one processor AP and the driving controller 100. The at least one processor AP may provide the image signal RGB, the control signal CTRL and a mode signal MD to the driving controller 100.

The driving controller 100 may determine an operating mode of the electronic device ED based on the mode signal MD. The operating mode may include a single frequency mode and a multi-frequency mode. In an embodiment, the multi-frequency mode may include a boundary area compensation mode and a normal compensation mode. The operation of the electronic device ED according to the operating mode may be as described in FIGS. 5 to 20.

An electronic device according to one or more embodiments of the present disclosure may be configured to operate in a multi-frequency mode in which a first display area is driven at a first frequency and a second display area is driven at a second frequency. In the multi-frequency mode, a bias voltage provided to pixels of the first display area may be at a first voltage level, and a bias voltage provided to pixels of the second display area may be at a second voltage level different from the first voltage level. Accordingly, in the multi-frequency mode, a luminance deviation between the first display area and the second display area due to a frequency difference between the first frequency and the second frequency may be compensated.

Although described above with reference to example embodiments, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

While the present disclosure has been described with reference to example embodiments thereof, it will be apparent to those of ordinary skill in the art that various changes and modifications may be made thereto without departing from the spirit and scope of the present disclosure as set forth in the following claims and their equivalents.

What is claimed is:

1. An electronic device comprising:

a display panel comprising pixels corresponding to a first display area and pixels corresponding to a second display area;

a driving controller configured to receive an input image signal and a control signal, and configured to output a voltage control signal; and a voltage generator configured to generate a bias voltage based on the voltage control signal, wherein a pixel of the pixels comprises:

a first transistor comprising a first electrode, a second electrode, and a gate electrode; and a second transistor comprising a first electrode connected to the first electrode of the first transistor, a second electrode connected to a bias voltage line receiving the bias voltage, and a gate electrode, wherein the driving controller is configured to, in a multi-frequency mode, control to drive the first display area at a first frequency, while driving the second display area at a second frequency different from the first frequency, and wherein the driving controller is configured to, in the multi-frequency mode, output the voltage control signal such that the bias voltage has a first bias voltage level to be applied to the pixels corresponding to the first display area, and the bias voltage has a second voltage level different from the first bias voltage level to be applied to the pixels corresponding to the second display area.

2. The electronic device of claim 1, wherein the second frequency is lower than the first frequency, and wherein the second voltage level is higher than the first bias voltage level.

3. The electronic device of claim 2, wherein, in the multi-frequency mode, the second display area of the display panel comprises a boundary area adjacent to the first display area and a non-boundary area adjacent to the boundary area.

4. The electronic device of claim 3, wherein the first bias voltage level corresponds to a default bias voltage level, and wherein the voltage generator is configured to, based on the boundary area of the second display area being driven in the multi-frequency mode, lower the bias voltage stepwise from the second voltage level to the default bias voltage level.

5. The electronic device of claim 2, wherein the voltage generator is configured to, based on the second display area being driven in the multi-frequency mode, determine the second voltage level of the bias voltage based on a stress index according to a ratio between the first frequency and the second frequency.

6. The electronic device of claim 5, wherein the voltage generator is configured to, based on the stress index being a first value, determine the second voltage level to have a first compensation voltage level, and based on the stress index being a second value greater than the first value, determine the second voltage level to have a second compensation voltage level higher than the first compensation voltage level.

7. The electronic device of claim 2, wherein the first bias voltage level corresponds to a default bias voltage level, wherein, in the multi-frequency mode, the first display area comprises a first boundary area adjacent to the second display area and a first non-boundary area adjacent to the first boundary area, and wherein the voltage generator is configured to, based on the first boundary area being driven, lower the bias voltage stepwise from the default bias voltage level.

8. The electronic device of claim 1, wherein the pixel further comprises:

a light emitting element comprising an anode and a cathode; and a third transistor comprising a first electrode connected to the anode of the light emitting element, a second electrode connected to an initialization voltage line receiving an initialization voltage, and a gate electrode, and wherein the voltage generator is further configured to generate the initialization voltage based on the voltage control signal.

9. The electronic device of claim 8, wherein the driving controller is configured to output the voltage control signal such that, in the multi-frequency mode, the initialization voltage has a default initialization voltage level based on the first display area being driven, and the initialization voltage has a compensation initialization voltage level lower than the default initialization voltage level based on the second display area being driven.

10. The electronic device of claim 9, wherein the voltage generator is configured to, based on a boundary area, which is adjacent to the first display area, within the second display area being driven in the multi-frequency mode, increase the initialization voltage stepwise from the compensation initialization voltage level to the default initialization voltage level.

11. The electronic device of claim 10, wherein the voltage generator is configured to, based on the second display area being driven in the multi-frequency mode, determine the compensation initialization voltage level of the initialization voltage based on a stress index according to a ratio between the first frequency and the second frequency.

12. The electronic device of claim 11, wherein the voltage generator is configured to, based on the stress index being a first value, determine the compensation initialization voltage level to have a first compensation initialization voltage level, and based on the stress index being a second value greater than the first value, determine the compensation initialization voltage level to have a second compensation initialization voltage level higher than the first compensation initialization voltage level.

13. The electronic device of claim 1, further comprising:

at least one processor configured to provide the input image signal, the control signal, and a mode signal, wherein the driving controller is configured to determine an operating mode based on the mode signal, the operating mode comprising a single frequency mode and the multi-frequency mode.

14. A method of driving an electronic device comprising a display panel, which comprises pixels corresponding to a first display area and pixels corresponding to a second display area, a pixel of the pixels comprising a first transistor, and a second transistor connected between a first electrode of the first transistor and a bias voltage line receiving a bias voltage, the method comprising:

identifying a first frequency of the first display area of the display panel, a second frequency of the second display area, and a start location of the second display area in a multi-frequency mode, wherein, in the multi-frequency mode, the first display area is driven at the first frequency while the second display area is driven at the second frequency different from the first frequency;

determining whether an operating mode is a boundary area compensation mode; and controlling a voltage level of the bias voltage based on determining that the operating mode is the boundary area compensation mode, wherein the controlling the voltage level of the bias voltage comprises:

controlling the bias voltage to have a first bias voltage level to be applied to the pixels corresponding to the first display area based on the first display area being driven in the multi-frequency mode; and controlling the bias voltage to have a second voltage level different from the first bias voltage level to be applied to the pixels corresponding to the second display area, based on a boundary area, which is adjacent to the first display area, within the second display area being driven.

15. The method of claim 14, wherein the second frequency is lower than the first frequency, and wherein the second voltage level is higher than the first bias voltage level.

16. The method of claim 15, wherein the first bias voltage level corresponds to a default bias voltage level, and wherein the controlling the voltage level of the bias voltage further comprises, based on the boundary area of the second display area being driven in the multi-frequency mode, lowering the bias voltage stepwise from the second voltage level to the default bias voltage level.

17. The method of claim 15, wherein the controlling the voltage level of the bias voltage further comprises, based on the second display area being driven in the multi-frequency mode, determining the second voltage level of the bias voltage based on a stress index according to a ratio between the first frequency and the second frequency.

18. The method of claim 17, wherein the controlling the voltage level of the bias voltage further comprises, based on the stress index being a first value, determining the second voltage level to have a first compensation voltage level, and based on the stress index being a second value greater than the first value, determining the second voltage level to have a second compensation voltage level higher than the first compensation voltage level.

19. The method of claim 15, wherein the first bias voltage level corresponds to a default bias voltage level, wherein, in the multi-frequency mode, the first display area comprises a first boundary area adjacent to the second display area and a first non-boundary area adjacent to the first boundary area, and wherein the controlling the voltage level of the bias voltage further comprises, based on the first boundary area being driven, lowering the bias voltage stepwise from the default bias voltage level.

20. The method of claim 15, wherein the pixel further comprises:

a light emitting element comprising an anode and a cathode; and a third transistor comprising a first electrode connected to the anode of the light emitting element, a second electrode connected to an initialization voltage line receiving an initialization voltage, and a gate electrode, and the method further comprising:

in the multi-frequency mode, controlling the initialization voltage to have a default initialization voltage level based on the first display area being driven, and controlling the initialization voltage to have a compensation initialization voltage level lower than the default initialization voltage level based on the second display area being driven.

* * * * *